(12) United States Patent
Han et al.

(10) Patent No.: US 11,502,762 B2
(45) Date of Patent: *Nov. 15, 2022

(54) SIGNAL PROCESSING DEVICE AND IMAGE DISPLAY APPARATUS INCLUDING THE SAME

(71) Applicant: LG Electronics Inc., Seoul (KR)

(72) Inventors: Jaeshin Han, Seoul (KR); Sukbum Lee, Seoul (KR); Sangchae Lim, Seoul (KR); Youngjin Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/138,225

(22) Filed: Dec. 30, 2020

(65) Prior Publication Data

US 2021/0119715 A1 Apr. 22, 2021

Related U.S. Application Data

(63) Continuation of application No. 16/422,351, filed on May 24, 2019, now Pat. No. 10,903,923.

(30) Foreign Application Priority Data

Aug. 30, 2018 (KR) .......................... 10-2018-0103074

(51) Int. Cl.
*G06F 15/16* (2006.01)
*H04H 60/32* (2008.01)
(Continued)

(52) U.S. Cl.
CPC ............ *H04H 60/32* (2013.01); *H04H 20/12* (2013.01); *H04H 20/72* (2013.01);
(Continued)

(58) Field of Classification Search
CPC ... H04L 60/32; H04L 20/72; H04L 25/03012; H04L 25/0224; H04H 20/12; H04N 5/911; H04N 5/921
(Continued)

(56) References Cited

U.S. PATENT DOCUMENTS

| | | | | |
|---|---|---|---|---|
| 7,375,741 | B2 * | 5/2008 | Huang | H04B 1/28 348/622 |
| 8,068,539 | B2 * | 11/2011 | Molev-Shteiman | H04L 25/03038 375/232 |
| 10,903,923 | B2 * | 1/2021 | Han | H04H 20/12 |
| 2004/0101068 | A1 * | 5/2004 | Wang | H04L 25/03057 375/326 |
| 2006/0198362 | A1 * | 9/2006 | Molev-Shteiman | H04L 25/03038 370/465 |

(Continued)

FOREIGN PATENT DOCUMENTS

| | | | | |
|---|---|---|---|---|
| JP | 4143174 B2 * | 9/2008 | ......... | H04L 27/2657 |
| WO | WO-2005041510 A1 * | 5/2005 | ............. | H04L 25/02 |
| WO | WO-2005041511 A1 * | 5/2005 | ......... | H04L 25/0212 |

*Primary Examiner* — Khanh Q Dinh

(74) *Attorney, Agent, or Firm* — Fish & Richardson P.C.

(57) ABSTRACT

The present invention relates to a signal processing apparatus and an image display apparatus including the same. The signal processing apparatus for processing a baseband signal demodulated from an RF signal, includes: a synchronizer; a channel estimator; an equalizer; an error corrector to perform error correction based on a signal output from the equalizer; and a mean square error calculator to calculate a mean square error based on a difference between an input signal from the equalizer and a reference signal, wherein when the RF signal includes a co-channel interference signal, the error corrector performs error correction by using a mean square error in a time domain or mean square errors in a time domain and a spatial domain. Accordingly, a baseband signal, from which a defect is removed, may be obtained in response to various communication channels or broadcast channels.

18 Claims, 20 Drawing Sheets

(51) Int. Cl.
*H04H 20/72* (2008.01)
*H04N 5/921* (2006.01)
*H04H 20/12* (2008.01)
*H04N 5/911* (2006.01)
*H04L 25/03* (2006.01)
*H04L 25/02* (2006.01)

(52) U.S. Cl.
CPC ....... *H04L 25/03012* (2013.01); *H04N 5/911* (2013.01); *H04N 5/921* (2013.01); *H04L 25/0224* (2013.01)

(58) Field of Classification Search
USPC .......................................... 709/220, 224, 227
See application file for complete search history.

(56) References Cited

U.S. PATENT DOCUMENTS

| | | | |
|---|---|---|---|
| 2008/0008285 A1* | 1/2008 | Smith | H03D 3/248 375/376 |
| 2009/0144791 A1* | 6/2009 | Huffman | H04N 21/2402 725/114 |
| 2011/0026576 A1* | 2/2011 | Molev-Shteiman | H04L 25/03038 375/231 |
| 2014/0269502 A1* | 9/2014 | Forenza | H04B 7/0626 370/328 |
| 2016/0219506 A1* | 7/2016 | Pratt | H04L 5/0051 |
| 2018/0309969 A1* | 10/2018 | Schluessler | H04N 5/911 |
| 2022/0046577 A1* | 2/2022 | Sundararajan | G06N 3/08 |

\* cited by examiner

SIGNAL PROCESSING DEVICE AND IMAGE DISPLAY APPARATUS INCLUDING THE SAME

CROSS-REFERENCE TO RELATED APPLICATION

This application is a continuation of U.S. application Ser. No. 16/422,351, filed on May 24, 2019, which claims the priority benefit of Korean Patent Application No. 10-2018-0103074, filed on Aug. 30, 2018. The disclosures of the prior applications are incorporated by reference in their entirety.

BACKGROUND OF THE INVENTION

1. Field of the Invention

The present invention relates to a signal processing device and an image display apparatus including the same, and more particularly to a signal processing device, which may obtain a baseband signal, from which a defect may be removed, in response to various communication channels or broadcast channels, and an image display apparatus including the same.

2. Description of the Related Art

A signal processing device is an apparatus for receiving and processing a terrestrial digital broadcasting signal and a mobile communication signal.

The signal processing device receives an RF signal, including a noise derived from a communication channel, via an antenna, and performs signal processing on the received RF signal.

In this case, channel estimation and error correction are performed, which requires calculation of mean square errors.

However, depending on communication channel conditions, mean square errors may be calculated inaccurately, such that error correction may not be performed efficiently.

Particularly, in the case where the RF signal is a digital broadcast signal, when the mean square errors are calculated inaccurately depending on communication channel conditions, error correction may not be performed properly, thereby causing a problem in that a defect occurs in the broadcast image.

SUMMARY OF THE INVENTION

It is an object of the present invention to provide a signal processing device and an image display apparatus including the same, which may obtain a baseband signal, from which a defect is removed, in response to various communication channels and broadcast channels.

It is another object of the present invention to provide a signal processing device and an image display apparatus including the same, which may improve accuracy in calculating a mean square error in response to various communication channels and broadcast channels.

In accordance with an aspect of the present disclosure, the above objects can be accomplished by providing a signal processing device for processing a baseband signal demodulated from an RF signal, the device including: a synchronizer to synchronize a signal based on the baseband signal; a channel estimator to perform interference estimation or channel estimation based on a signal output from the synchronizer; an equalizer to perform equalization based on a signal output from the channel estimator; an error corrector to perform error correction based on a signal output from the equalizer; and a mean square error calculator to calculate a mean square error based on a difference between an input signal from the equalizer and a reference signal, wherein when the RF signal includes a co-channel interference signal, the error corrector performs error correction by using a mean square error in a time domain or mean square errors in a time domain and a spatial domain.

When the RF signal includes the co-channel interference signal, the mean square error calculator may calculate a final mean square error by using the mean square error in the time domain or the mean square errors in the time domain and the spatial domain; and the error corrector may perform error correction by using the final mean square error to output an error-corrected signal.

When a maximum level in a frequency band of the co-channel interference signal is equal to or higher than a maximum level in a frequency band of the baseband signal, the mean square error calculator may output a final mean square error by using the mean square error in the time domain or the mean square errors in the time domain and the spatial domain, instead of a frequency domain; and the error corrector may perform error correction by using the final mean square error to output an error-corrected signal.

When the RF signal includes a burst noise, the mean square error calculator may output a final mean square error by using a mean square error in at least either one of the frequency domain or the spatial domain; and the error corrector may perform error correction by using the final mean square error to output an error-corrected signal.

The mean square error calculator may calculate mean square errors in at least one of the time domain, the frequency domain, and the spatial domain, and may output a final mean square error by using at least one of the calculated mean square errors; and the equalizer may perform the equalization by using the calculated final mean square error based on the input signal and the reference signal.

The mean square error calculator may calculate an error based on a difference between the input signal from the error corrector and the reference signal, and based on the calculated error e, may calculate mean square errors in at least one of the time domain, the frequency domain, and the spatial domain, to output a second final mean square error by using at least one of the calculated mean square errors; and the error corrector may perform error correction by using the second final mean square error calculated by the mean square error calculator.

The mean square error calculator may include: an error calculator to calculate an error corresponding to a difference between the reference signal and the input signal; a time-domain filter to calculate a first mean square error in the time domain based on the calculated error e; a frequency-domain filter to calculate a second mean square error in a frequency domain based on the calculated error e; a space-domain filter to calculate a third mean square error in a spatial domain based on the calculated error e; and an error controller to control to output a final mean square error by using at least one of the mean square errors output by the time-domain filter, the frequency-domain filter, and the space-domain filter.

In response to the first mean square error being equal to or greater than a first reference value, the error controller may control to output the final mean square error based on the second mean square error and the third mean square error.

In response to the first mean square error being equal to or greater than the first reference value, and the second mean square error being less than a second reference value, the error controller may control to output the final mean square error based on the second and the third mean square errors.

In response to the first to the third mean square errors being less than a third reference value, the error controller may control to output the final mean square error based on the first and the second mean square errors or based on the first to the third mean square errors.

In response to the third mean square error being equal to or greater than a fourth reference value, the error controller may control to output the final mean square error based on the first and the second mean square errors.

In response to the input baseband signal being a baseband signal corresponding to a broadcast signal, the error controller may control to output the final mean square error based on the first and the second mean square errors.

The mean square error calculator may output a final mean square error by using a weighted value applied to the mean square error in each of the time domain, the frequency domain, and the spatial domain.

The signal processing device may further include a tuner to receive the RF signal, including noise derived from a communication channel, and to convert the received RF signal into a baseband signal, wherein the channel estimator may perform channel estimation based on the baseband signal input from the tuner.

The signal processing device may further include: a tuner to receive the RF signal, including noise derived from a communication channel, and to convert the received RF signal into an intermediate frequency signal; and a demodulator to convert the intermediate frequency signal into the baseband signal, wherein the channel estimator may perform channel estimation based on the baseband signal input from the demodulator.

In accordance with another aspect of the present disclosure, the above objects can be accomplished by providing an image display apparatus including: a signal processing device to process a baseband signal demodulated from an RF signal: a controller to extract a broadcast image from a broadcast signal received from the signal processing device; and a display to display the extracted broadcast image; wherein when the RF signal includes a co-channel interference signal, the display displays a broadcast image processed by the signal processing device to remove a defect.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Hereinafter, embodiments of the present disclosure will be described in further detail with reference to the accompanying drawings.

In the following description, the terms "module" and "unit", which are used herein to signify components, are merely intended to facilitate explanation of the present disclosure, and the terms do not have any distinguishable difference in meaning or role. Thus, the terms "module" and "unit" may be used interchangeably.

Figure 1:
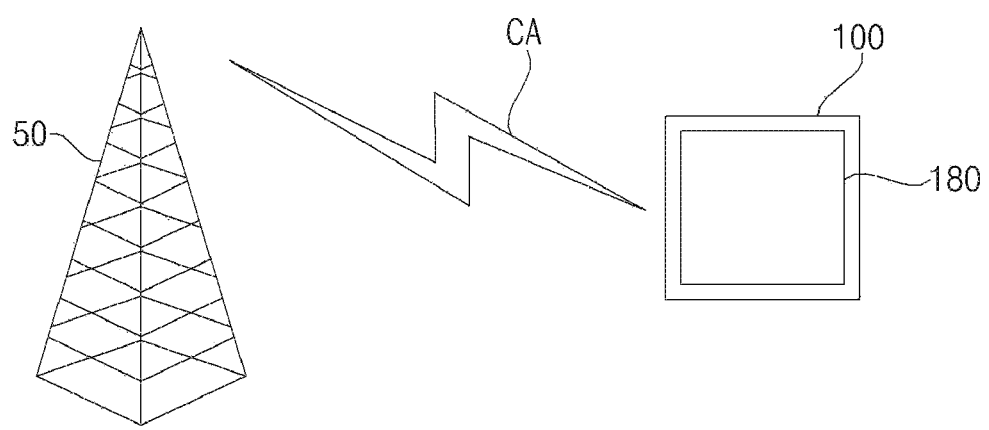
FIG. 1 is a diagram illustrating an RF signal receiving system according to an embodiment of the present invention.

FIG. 1 is a diagram illustrating an RF signal receiving system according to an embodiment of the present invention.

Figure 5A:
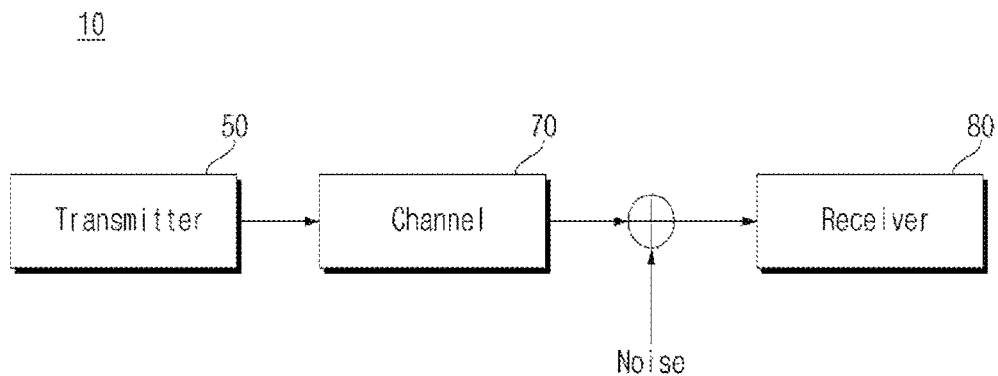
FIG. 5A is a block diagram illustrating an RF signal receiving system according to an embodiment of the present disclosure.

Referring to FIG. 1, the RF signal receiving system 10 includes a wireless signal transmitting device 10 which transmits an RF signal CA, and an image display apparatus 100 including an RF signal processing device 80 of FIG. 5A which receives the RF signal CA.

The RF signal processing device 80 of FIG. 5A according to an embodiment of the present disclosure is desirably an RF signal processing device which may improve accuracy in calculating a mean square error in response to various communication channels or broadcast channels.

Figure 5B:
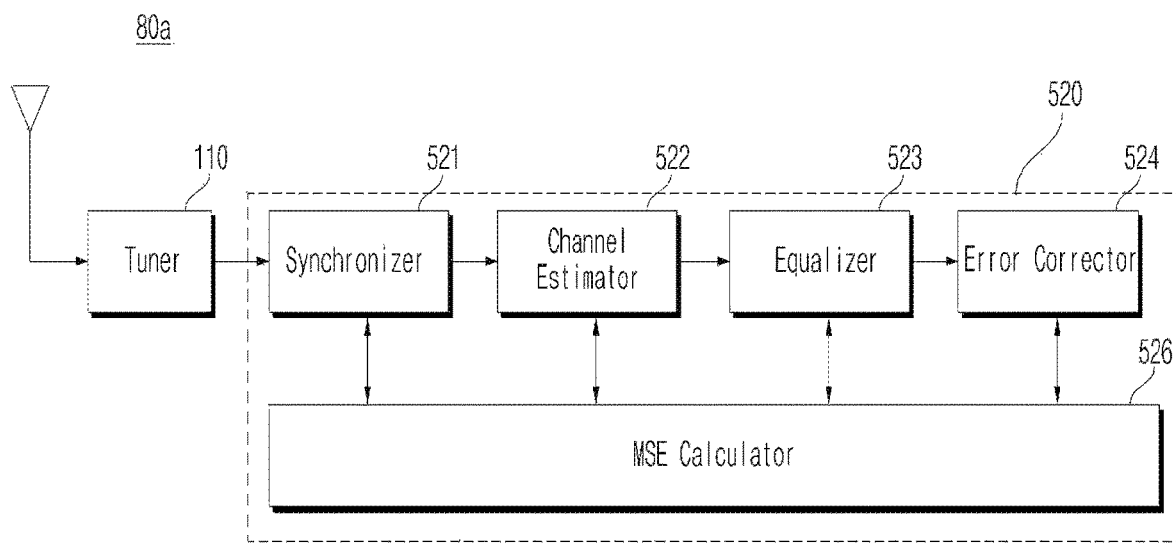
FIG. 5B is a block diagram illustrating an example of an RF signal processing device according to an embodiment of the present disclosure.

To this end, the RF signal processing device 80 of FIG. 5A according to an embodiment of the present disclosure includes: a synchronizer 521 of FIG. 5B which synchronizes a signal based on a baseband signal; a channel estimator 522 of FIG. 5B which performs interference estimation or channel estimation based on a signal output from the synchronizer 521 of FIG. 5B; an equalizer 523 of FIG. 5B which performs equalization based on a signal output from the channel estimator 522 of FIG. 5B; an error corrector 524 of FIG. 5B which performs error correction based on a signal output from the equalizer 523 of FIG. 5B; and a mean square error calculator 526 of FIG. 5B which calculates a mean square error based on a difference between an input signal from the equalizer 523 of FIG. 5B, and a reference signal, in which in the case where the RF signal includes a co-channel interference signal, the error corrector 524 performs error correction by using a mean square error in a time domain or mean square errors in a time domain and a spatial domain, thereby obtaining a baseband signal, from which a defect is removed, in response to various communication channels or broadcast channels.

In the case where an RF signal includes a co-channel interference signal, the mean square error calculator 526 of FIG. 5B outputs a final mean square error by using a mean square error in a time domain or mean square errors in a time domain and a spatial domain. The error corrector 524 performs error correction on the final mean square error to output an error-corrected signal, thereby obtaining a baseband signal, from which a defect is removed, in response to various communication channels or broadcast channels.

Further, in the case where an RF signal includes burst noise which occurs sporadically in the time domain, the mean square error calculator 526 of FIG. 5B outputs a final mean square error by using a mean square error in at least either one of the frequency domain or the spatial domain. The error corrector 524 performs error correction on the final mean square error to output an error-corrected signal, thereby obtaining a baseband signal, from which a defect is removed, in response to various communication channels or broadcast channels.

When calculating the mean square error, the mean square error calculator 526 of FIG. 5B calculates Mean Square Errors (MSE) in at least one of the time domain, the frequency domain, and the spatial domain based on a difference between a reference signal and an input signal, and outputs a final mean square error (FMSE) by using at least one of the calculated mean square errors, thereby improving accuracy in calculating a mean square error in response to various communication channels or broadcast channels.

For example, the mean square error calculator 526 of FIG. 5B calculates mean square errors in two domains among the time domain, the frequency domain, and the spatial domain, and may output a final mean square error (PMSE) by using the calculated two mean square errors.

In another example, the mean square error calculator 526 of FIG. 5B calculates mean square errors in two domains among the time domain, the frequency domain, and the spatial domain, and may output a final mean square error (PMSE) by using one of the calculated two mean square errors.

In yet another example, the mean square error calculator 526 of FIG. 5B calculates mean square errors in all the three domains of the time domain, the frequency domain, and the spatial domain, and may output a final mean square error (PMSE) by using one of the calculated three mean square errors.

In still another example, the mean square error calculator 526 of FIG. 5B calculates mean square errors in all the three domains of the time domain, the frequency domain, and the spatial domain, and may output a final mean square error (PMSE) by using two of the calculated three mean square errors.

In still another example, the mean square error calculator 526 of FIG. 5B calculates mean square errors in all the three domains of the time domain, the frequency domain, and the spatial domain, and may output a final mean square error (PMSE) by using all the calculated three mean square errors.

In addition, the mean square error calculator 526 of FIG. 5B may calculate a final mean square error (FMSE) by using a weighted value applied to a mean square error in each of the time domain, the frequency domain, and the spatial domain, thereby improving accuracy in calculating a mean square error in response to various communication channels or broadcast channels.

Figure 2A:
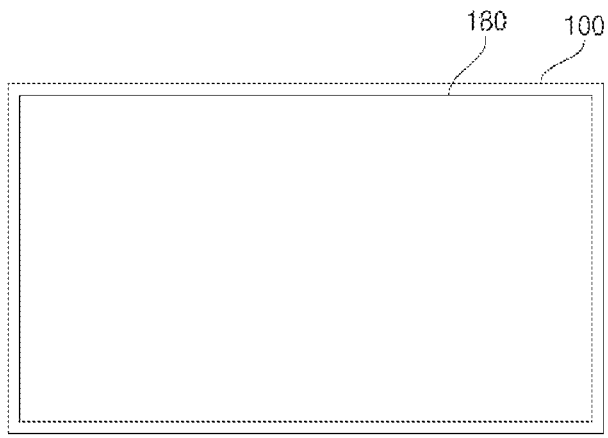
FIG. 2A is a diagram illustrating an example of an image display apparatus according to an embodiment of the present disclosure.

The RF signal CA of FIG. 1 may be a terrestrial digital broadcasting signal, in which case the RF signal processing device 80 of FIG. 1 may be mounted in an image display apparatus 100 of FIG. 2A such as TV.

Figure 2B:
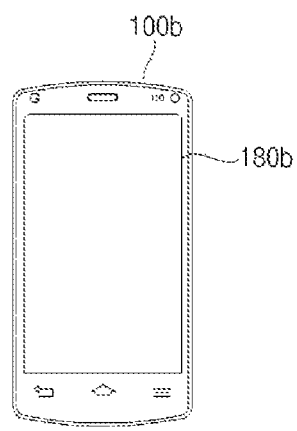
FIG. 2B is a diagram illustrating another example of an image display apparatus according to an embodiment of the present disclosure.

Furthermore, the RF signal CA of FIG. 1 may be a digital mobile communication signal, in which case the RF signal processing device 80 of FIG. 1 may be mounted in a mobile terminal 100b of FIG. 2B such as a cellular phone, a tablet PC, and the like.

FIG. 2A is a diagram illustrating an example of an image display apparatus according to an embodiment of the present disclosure.

Referring to FIG. 2A, the image display apparatus 100 of FIG. 2A includes a display 180, in addition to the RF signal processing device 80 of FIG. 1.

With respect to a received broadcast signal, the image display apparatus 100 of FIG. 2A outputs a final mean square error by using a mean square error in at least one of the time domain, the frequency domain, and the spatial domain, and performs error correction on the final mean square error, thereby improving accuracy in calculating a mean square error in response to various communication channels or broadcast channels, and accurately performing error correction. Accordingly, a defect may be removed from a broadcast image in response to various channels.

FIG. 2B is a diagram illustrating another example of an image display apparatus according to an embodiment of the present disclosure.

Referring to FIG. 2B, a mobile terminal 100b of FIG. 2B includes a display 180b, in addition to the RF signal processing device 80 of FIG. 1.

With respect to a received mobile communication signal, the mobile terminal 100b of FIG. 2B outputs a final mean square error by using a mean square error in at least one of the time domain, the frequency domain, and the spatial domain, and performs error correction on the final mean square error, thereby improving accuracy in calculating a mean square error in response to various communication channels or broadcast channels, and accurately performing error correction. Accordingly, a defect may be removed during a voice call or a video call in response to various channels.

Figure 3:
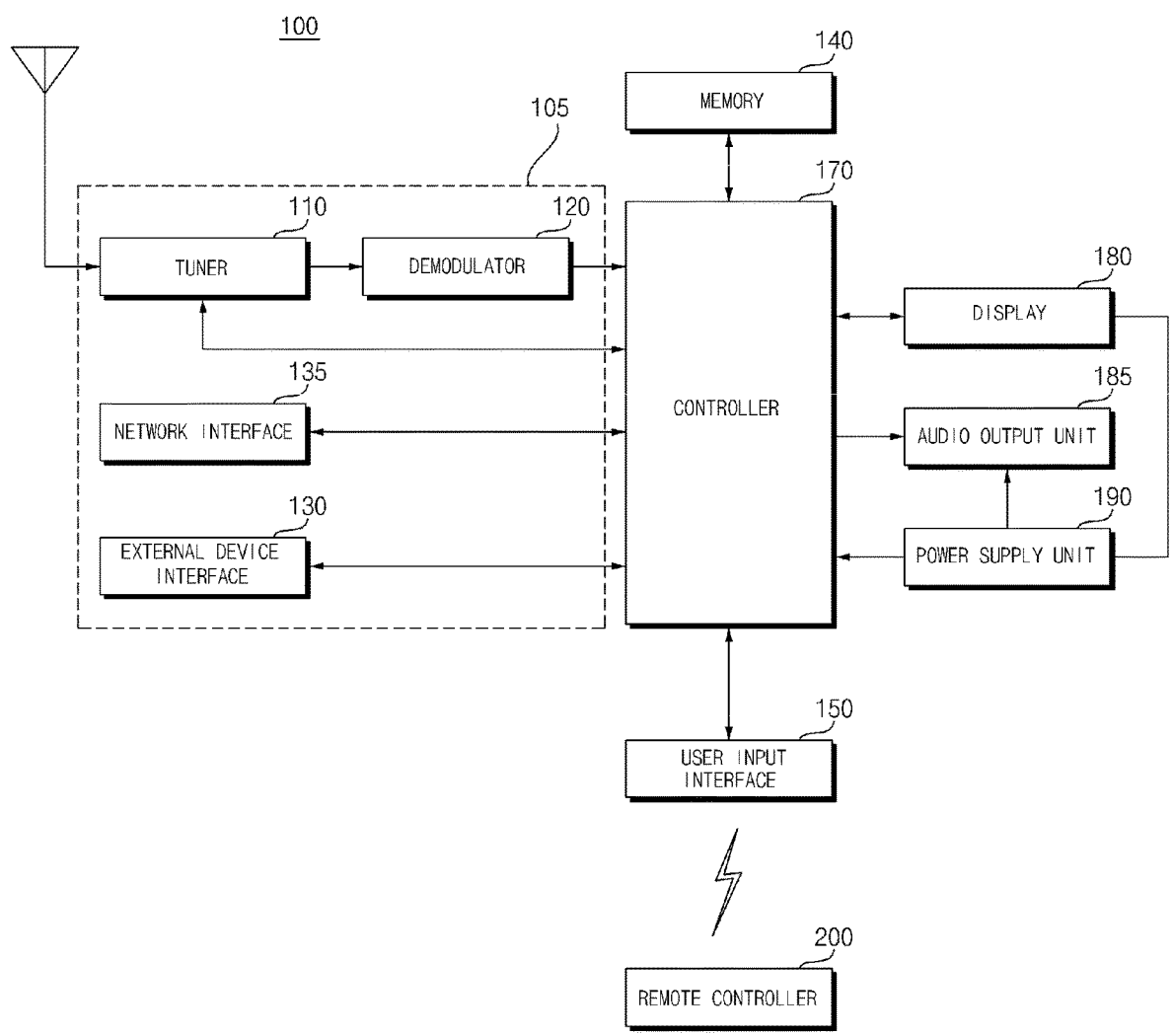
FIG. 3 is an internal block diagram of the image display apparatus of FIG. 2A.

FIG. 3 is an internal block diagram of the image display apparatus of FIG. 2A.

Referring to FIG. 3, the image display apparatus 100 according to an embodiment of the present disclosure includes a broadcast receiver 105, an external device interface 130, a memory 140, a user input interface 150, a sensor unit (not shown), a controller 170, a display 180, and an audio output unit 185.

The broadcast receiver 105 includes a tuner 110, a demodulator 120, a network interface 130, and an external device interface 135.

Unlike the embodiment of FIG. 3, the demodulator 120 may be included in the tuner 110.

Further, unlike the embodiment of FIG. 3, the broadcast receiver 105 may include only the tuner 110, the demodulator 120, and the external interface 135, i.e., without including the network interface 130.

The tuner 110 may tune a Radio Frequency (RF) broadcast signal corresponding to a channel selected by a user or all the previously stored channels, among RF broadcast signals received via an antenna (not shown). In addition, the tuner 110 may convert the tuned RF broadcast signal into an intermediate frequency signal or a baseband signal (baseband image signal or baseband audio signal).

For example, if the selected RF broadcast signal is a digital broadcast signal, the tuner 110 converts the digital broadcast signal into a digital IF signal (DIF), and if the selected RF broadcast signal is an analog broadcast signal, the tuner 110 converts the analog broadcast signal into a baseband image or an audio signal (CVBS/SIF). That is, the tuner 110 may process the digital broadcast signal or the analog broadcast signal. The analog baseband image or the audio signal (CVBS/SIF), which is output from the tuner 110, may be directly input to the controller 170.

The tuner 110 may include a plurality of tuners to receive broadcast signals of a plurality of channels. Alternatively, the tuner 110 may be a single turner which receives broadcast signals of a plurality of channels simultaneously.

The demodulator 120 may receive the digital IF (DIF) signal converted by the tuner 110, and may demodulate the digital IF signal.

For example, the demodulator 120 may convert the digital IF (DIF) signal, which is converted by the tuner 110, into a baseband signal.

Upon performing demodulation and channel decoding, the demodulator 120 may output a stream signal (TS). Here, the stream signal may be a signal obtained by multiplexing an image signal, an audio signal, or a data signal.

The stream signal, output from the demodulator 120, may be input into the controller 170. Upon performing demultiplexing, A/V signal processing, and the like, the controller 170 may output video to the display 180 and audio to the audio output unit 185.

The external device interface 130 may be connected to an external device (not shown), e.g., a set-top box 50, to transmit or receive data. To this end, the external device interface 130 may include an A/V input and output unit (not shown).

The external device interface 130 may be connected, wirelessly or by wire, to an external device, such as a digital versatile disk (DVD), a Blu-ray, a game console, a camera, a camcorder, a computer (laptop computer), a set-top box, and the like, and may perform an input/output operation with the external device.

The A/V input/output unit may receive input of image and audio signals of the external device. A wireless communication unit (not shown) may perform short-range wireless communication with other electronic devices.

By connection with such wireless communication unit (not shown), the external device interface 130 may exchange data with an adjacent mobile terminal 160. Particularly, in a mirroring mode, the external device interface 130 may receive device information, information on executed applications, application images, and the like from the mobile terminal 600.

The network interface 135 serves as an interface for connecting the image display apparatus 100 and a wired or wireless network such as the Internet. For example, the network interface 135 may receive contents or data from the Internet, a content provider, or a network operator over a network.

Further, the network interface 135 may include the wireless communication unit (not shown).

The memory 140 may store programs for processing and controlling each signal by the controller 170, or may store processed video, audio, or data signals.

In addition, the memory 140 may also temporarily store video, audio, or data signals input via the external device interface 130. Furthermore, the memory 140 may store information related to a predetermined broadcast channel using a channel memory function of a channel map and the like.

While FIG. 3 illustrates an example where the memory 140 is separately provided from the controller 170, the present disclosure is not limited thereto, and the memory 140 may be included in the controller 170.

The user input interface 150 transmits a signal, input by a user, to the controller 170, or transmits a signal from the controller 170 to the user.

For example, the user input interface 150 may transmit/receive user input signals, such as a power on/off signal, a channel selection signal, a screen setting signal, and the like, to and from a remote controller 200; may transfer a user input signal, which is input from a local key (not shown), such as a power key, a channel key, a volume key, or a setting key, to the controller 170; may transfer a user input signal, which is input from a sensor unit (not shown) for sensing a user's gesture, to the controller 170; or may transmit a signal from the controller 170 to the sensor unit (not shown).

The controller 170 may demultiplex stream, which is input via the tuner 110, the demodulator 120, a network interface 135, or the external interface unit 130, or may process the demultiplexed signals, to generate and output signals for outputting video or audio.

The video signal processed by the controller 170 may be input to the display 180 to be output as a video corresponding to the video signal. Further, the video signal processed by the controller 170 may be input to an external output device via the external device interface 130.

The audio signal processed by the controller 170 may be output to the audio output unit 185. Further, the audio signal processed by the controller 170 may be input to the external output device through the external device interface 130.

Although not illustrated in FIG. 3, the controller 170 may include a demultiplexer, a video processor, and the like, which will be described later with reference to FIG. 4.

In addition, the controller 170 may control the overall operation of the image display apparatus 100. For example, the controller 170 may control the tuner 110 to tune to an RF broadcast corresponding to a user-selected channel or a pre-stored channel.

Further, the controller 170 may control the image display apparatus 100 by a user command input via the user input interface 150 or an internal program.

For example, the controller 170 may control the display 180 to display an image. In this case, the image displayed on the display 180 may be a still image or a video, or a 2D or 3D image.

In addition, the controller 170 may control the display 180 to display a predetermined object in the displayed image. For example, the object may be at least one of an accessed web screen (newspaper, magazine, etc.), an Electronic Program Guide (EPG), various menus, a widget, an icon, a still image, a video, and text.

The controller 170 may recognize a user's location based on an image captured by a capturing unit (not shown). For example, the controller 170 may recognize a distance (z-axial coordinates) between the user and the image display apparatus 100. Also, the controller 170 may recognize x-axial coordinates and y-axial coordinates in the display 180 corresponding to the user's location.

The display 180 converts a video signal, a data signal, an OSD signal, a control signal which are processed by the controller 170, or a video signal, a data signal, a control signal, and the like which are received via the external device interface 130, to generate a driving signal.

Further, the display 180 may be implemented as a touch screen to be used as an input device as well as an output device.

The audio output unit 185 may output sound by receiving an audio signal processed by the controller 170.

The capturing unit (not shown) captures a user's image. The capturing unit (not shown) may be implemented with a single camera, but is not limited thereto, and may be implemented with a plurality of cameras. The image information captured by the capturing unit (not shown) may be input to the controller 170.

The controller 170 may sense a user's gesture based on the image captured by the capturing unit (not shown), a signal sensed by the sensor unit (not shown), or a combination thereof.

The power supply unit 190 may supply power throughout the image display apparatus 100. Particularly, the power supply unit 190 may supply power to the controller 170 which may be implemented in a form of a system on chip (SOC), the display 180 to display an image, and the audio output unit 185 to output an audio.

Specifically, the power supply unit 190 may include a converter which converts an alternating current into a direct current, and a dc/dc converter which converts the level of the direct current.

The remote controller 200 transmits a user input to the user input interface 150. To this end, the remote controller 200 may use various communication techniques, such as Bluetooth, RF communication, IR communication, Ultra Wideband (UWB), ZigBee, and the like. Further, the remote controller 200 may receive video, audio, or data signals output from the user input interface 150, to display the signals on the remote controller 200 or output the signal thereon in the form of sound.

The above-described image display apparatus 100 may be a fixed or mobile digital broadcast receiver capable of receiving digital broadcast.

The block diagram of the image display apparatus 100 illustrated in FIG. 3 is only by example. Depending upon the specifications of the image display apparatus 100 in actual implementation, the components of the image display apparatus 100 may be combined or omitted or new components may be added. That is, two or more components may be incorporated into one component or one component may be configured as separate components, as needed. In addition, the function of each block is described for the purpose of describing the embodiment of the invention and thus specific operations or devices should not be construed as limiting the scope and spirit of the invention.

Figure 4:
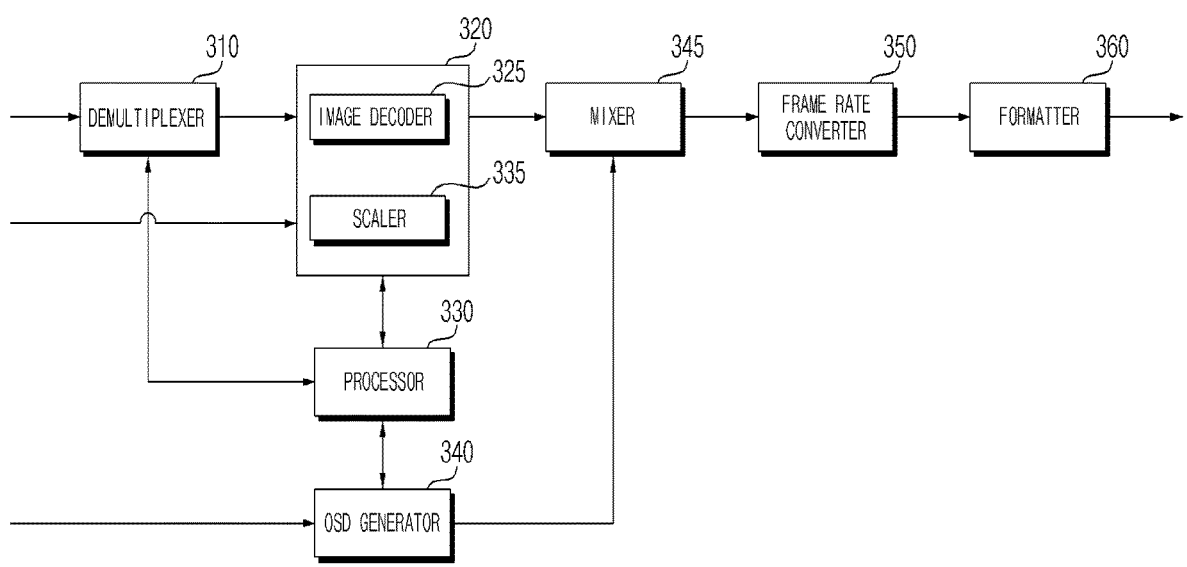
FIG. 4 is an internal block diagram of a controller of FIG. 3.

FIG. 4 is an internal block diagram of the controller of FIG. 3.

Referring to FIG. 4, the controller 170 according to an embodiment of the present disclosure includes a demultiplexer 310, a video processor 320, a processor 330, an OSD generator 340, a mixer 345, a frame rate converter 350, and a formatter 360. In addition, the processor 170 may further include an audio processor (not shown) and a data processor (not shown).

The demultiplexer 310 demultiplexes an input stream. For example, the demultiplexer 310 may demultiplex an MPEG-2 TS into a video signal, an audio signal, and a data signal. Here, the stream signal input to the demultiplexer 310 may be a stream signal output from the tuner 110, the demodulator 120, or the external device interface 130.

The video processor 320 may process the demultiplexed video signal. To this end, the video processor 320 may include a video decoder 325 and a scaler 335.

The video processor 325 decodes the demultiplexed video signal, and the scaler 335 scales resolution of the decoded video signal so that the video signal may be displayed on the display 180.

The video decoder 325 may include decoders of various standards. Examples of the video decoder 325 may include an MPEG-2 decoder, an H.264 decoder, a 3D image decoder for decoding a color image and a depth image, a decoder for decoding an image having a plurality of viewpoints, and the like.

The processor 330 may control the overall operation of the image display apparatus 100 or the controller 170. For example, the processor 330 controls the tuner 110 to tune to an RF signal corresponding to a channel selected by the user or a previously stored channel.

The processor 330 may control the image display apparatus 100 by a user command input through the user input interface 150 or an internal program.

Further, the processor 330 may control data transmission of the network interface 135 or the external device interface 130.

In addition, the processor 330 may control the operation of the demultiplexer 310, the video processor 320, the OSD generator 340 of the controller 170, and the like.

The OSD generator 340 generates an OSD signal autonomously or according to user input. For example, the OSD generator 340 may generate signals by which various types of information are displayed as graphics or text on the display 180 according to a user input signal. The generated OSD signal may include various data such as a User Interface (UI), various menus, widgets, icons, etc. Further, the generated OSD signal may include a 2D object or a 3D object.

The OSD generator 340 may generate a pointer which can be displayed on the display according to a pointing signal received from the remote controller 200. Particularly, such pointer may be generated by a pointing signal processor, and the OSD generator 340 may include such pointing signal processor (not shown). Alternatively, the pointing signal processor (not shown) may be provided separately from the OSD generator 340 without being included therein.

The mixer 345 may mix the OSD signal generated by the OSD generator 340 and the decoded video signal processed by the video processor 320. The mixed video signal is provided to the frame rate converter 350.

The frame rate converter (FRC) 350 may convert a frame rate of an input video. The frame rate converter 350 may output the input video as it is without converting the frame rate.

The formatter 360 may convert the format of a video signal. For example, the formatter 360 may convert the format of a 3D image signal into any one of various 3D formats, such as a side-by-side format, a top-down format, a frame sequential format, an interlaced format, a checker box format, and the like.

The audio processor (not shown) in the controller 170 may process the demultiplexed audio signal, or an audio signal of a predetermined content. To this end, the audio processor 370 may include various decoders.

Further, the audio processor (not shown) in the controller 170 may also adjust the bass, treble, or volume of the audio signal.

A data processor (not shown) in the controller 170 may process the demultiplexed data signal. For example, when the demultiplexed data signal is encoded, the data processor may decode the encoded demultiplexed data signal. Here, the encoded data signal may be Electronic Program Guide (EPG) information including broadcast information such as the start time and end time of a broadcast program which is broadcast through each channel.

The block diagram of the controller 170 illustrated in FIG. is by example. The components of the block diagrams may be integrated or omitted, or a new component may be added according to the specifications of the controller 170.

Particularly, the frame rate converter 350 and the formatter 360 may not be included in the controller 170 but may be provided individually, or may be provided separately as one module.

FIG. 5A is a block diagram illustrating an RF signal receiving system according to an embodiment of the present disclosure.

Referring to FIG. 5A, the RF signal receiving system 10 according to an embodiment of the present disclosure includes a wireless signal transmitting device 10 which transmits an RF signal CA, and an RF signal processing device 80 which receives the RF signal CA.

A noise signal, derived from a communication channel 70, is added to the RF signal CA transmitted by the wireless signal transmitting device 10, and the RF signal processing device 80 receives the RF signal CA, to which the noise signal is added.

FIG. 5B is a block diagram illustrating an example of an RF signal processing device according to an embodiment of the present disclosure.

Referring to FIG. 5B, the RF signal processing device 80a according to an embodiment of the present disclosure includes a tuner 110, which receives an RF signal including noise derived from the communication channel, and converts the received RF signal into a baseband signal, and a signal processor 520 which performs signal processing on the baseband signal.

In this case, the tuner 110 may also function as a demodulator. Alternatively, the RF signal processing device 80a may also function as the demodulator of FIG. 2.

The signal processor 520 includes a synchronizer 521, a channel estimator 522, an equalizer 523, an error corrector 524, and a mean square error calculator 526.

The synchronizer 521 may perform synchronization based on an input baseband signal.

Further, the synchronizer 521 may perform synchronization based on a final mean square error input from the mean square error calculator 526.

For example, the synchronizer 521 may perform synchronization based on a final mean square error input from the mean square error calculator 526, and may perform synchronization again based on an updated final mean square error.

The mean square error calculator 526 may calculate an error e, which is a difference between the input baseband signal and a pilot signal which is a reference signal; may calculate at least one of a first mean square error TD in a time domain, a second mean square error FD in a frequency domain, and a third mean square error SD in a spatial domain, with respect to the calculated error e; and may output a final mean square error (PMSE) by selecting at least one of the first mean square error TD, the second mean square error FD, and the third mean square error SD.

The channel estimator 522 may perform interference estimation or channel estimation based on the signal synchronized by the synchronizer 521.

The channel estimator 522 may perform interference estimation or channel estimation based on the final mean square error output by the mean square error calculator 526.

For example, the channel estimator 522 may perform interference estimation or channel estimation based on the final mean square error output by the mean square error calculator 526, and may perform again interference estimation or channel estimation based on an updated final mean square error output by the mean square error calculator 526.

The mean square error calculator 526 may calculate an error e, which is a difference between the input synchronized signal and a pilot signal which is a reference signal; based on the calculated error e, may calculate at least one of the first mean square error TD in the time domain, the second mean square error FD in the frequency domain, and the third mean square error SD in the spatial domain; and may output a final mean square error (PMSE) by selecting at least one of the first mean square error TD, the second mean square error FD, and the third mean square error SD.

In addition, the channel estimator 522 may estimate that a communication channel includes any one of co-channel interference, adjacent-channel interference, single frequency interference, burst noise, and phase noise.

Further, the channel estimator 522 may also estimate a communication channel as any one of a static channel, a mobile channel, and the like.

The static channel may include a Rayleigh channel, a Rician channel, and the like; and the mobile channel may include a Vehicular channel, a doppler channel, and the like.

For example, among the first to the third mean square errors TD, FD, and SD, in the case where the first mean square error TD is equal to or greater than a first reference value, and the second mean square error FD and the third mean square error SD are less than the first reference value, the channel estimator 522 may estimate that a communication channel includes burst noise interference.

In another example, in the case where the first mean square error TD is equal to or greater than the first reference value, and the second mean square error FD is less than a second reference value, the channel estimator 522 may estimate that a communication channel includes burst noise interference.

In yet another example, in the case where the first to the third mean square errors TD, FD, and SD, calculated by the mean square error calculator 526, are less than a third reference value, the channel estimator 522 may estimate that a communication channel is the static channel.

In still another example, among the first to the third mean square errors TD, FD, and SD, in the case where the first and the second mean square errors TD and FD are less than a fourth reference value, but the third mean square error SD is equal to or greater than the fourth reference value, the channel estimator 522 may estimate that a communication channel is the mobile channel.

The equalizer 523 may perform equalization on the estimated interference or channel.

The equalizer 523 may perform synchronization based on a final mean square error calculated by the mean square error calculator 526.

For example, the equalizer 523 may perform synchronization based on a final mean square error calculated by the mean square error calculator 526, and may perform synchronization again based on an updated final mean square error.

The mean square error calculator 526 may calculate an error e, which is a difference between the input signal, on which channel estimation is performed, and a pilot signal which is a reference signal; may calculate at least one of the first mean square error TD in the time domain, the second mean square error FD in the frequency domain, and the third mean square error SD in the spatial domain, with respect to the calculated error e; and may output a final mean square error (PMSE) by selecting at least one of the first mean square error TD, the second mean square error FD, and the third mean square error SD.

When performing equalization, the equalizer 523 may perform channel equalization by using channel information. For example, the equalizer 523 may perform channel equalization by using Fast Fourier Transform (FFT) and Inverse FFT (IFFT) in the time domain or the frequency domain.

The error corrector 524 may perform error correction based on the signal (equalization signal) equalized by the equalizer 523, and the final mean square error (PMSE) calculated by the mean square error calculator 526.

The final mean square error (PMSE), calculated by the mean square error calculator 526, may be calculated based on the signal equalized by the equalizer 523.

As the error corrector 524 performs error correction based on the final mean square error (PMSE) optimized by the mean square error calculator 526, thereby accurately performing error correction.

For example, among the first to the third mean square errors TD, FD, and SD calculated by the mean square error calculator 526, in the case where the first mean square error TD is equal to or greater than a first reference value, and the second mean square error FD and the third mean square error SD are less than the first reference value, the error corrector 524 performs error correction using the final mean square error (FMSE), which is output based on the second mean square error FD and the third mean square error SD, thereby accurately performing error correction even in the presence of burst noise interference.

In another example, in the case where the first mean square error TD is equal to or greater than the first reference value, and the second mean square error FD is less than a second reference value, the error corrector 524 performs error correction using the final mean square error (FMSE), which is output based on the second mean square error FD and the third mean square error SD, thereby accurately performing error correction even in the presence of burst noise interference.

In yet another example, in the case where the first to the third mean square errors TD, FD, and SD, calculated by the mean square error calculator 526, are less than a third reference value, the error corrector 524 performs error correction using the final mean square error (FMSE), which is output based on the first to the third mean square errors TD, FD, and SD, thereby accurately performing error correction by considering that the communication channel is a static channel.

In still another example, among the first to the third mean square errors TD, FD, and SD, in the case where the first and the second mean square errors TD and FD are less than a fourth reference value, but the third mean square error SD is equal to or greater than the fourth reference value, the error corrector 524 performs error correction using the final mean square error (PMSE), which is output based on the first and the second mean square errors TD and FD, thereby accurately performing error correction even when the communication channel is a mobile channel.

Further, in the case where an RF signal includes a co-channel interference signal, the error corrector 524 performs error correction by using the mean square error in the time domain or the mean square errors in the time domain and the spatial domain, thereby obtaining a baseband signal, from which a defect is removed, in response to various communication channels or broadcast channels.

In the case where an RF signal includes a co-channel interference signal, the mean square error calculator 526 may output a final mean square error by using the mean square error in the time domain or the mean square errors in the time domain and the spatial domain. The error corrector 524 performs error correction using the final mean square error to output an error-corrected signal, thereby obtaining a baseband signal, from which a defect is removed, in response to various communication channels or broadcast channels.

In the case where a maximum level in a frequency band of a co-channel interference signal is equal to or higher than a maximum level in a frequency band of a baseband signal, the mean square error calculator 526 may output a final mean square error by using the mean square error in the time domain or the mean square errors in the time domain and the spatial domain, instead of the frequency domain. The error corrector 524 performs error correction using the final mean square error to output an error-corrected signal, thereby obtaining a baseband signal, from which a defect is removed, in response to various communication channels or broadcast channels.

Further, in the case where an RF signal includes a burst noise, which occurs sporadically in the time domain, the mean square error calculator 526 may output a final mean square error by using the mean square error in at least one of the frequency domain or the spatial domain. The error corrector 524 performs error correction using the final mean square error to output an error-corrected signal, thereby obtaining a baseband signal, from which a defect is removed, in response to various communication channels or broadcast channels.

Figure 5C:
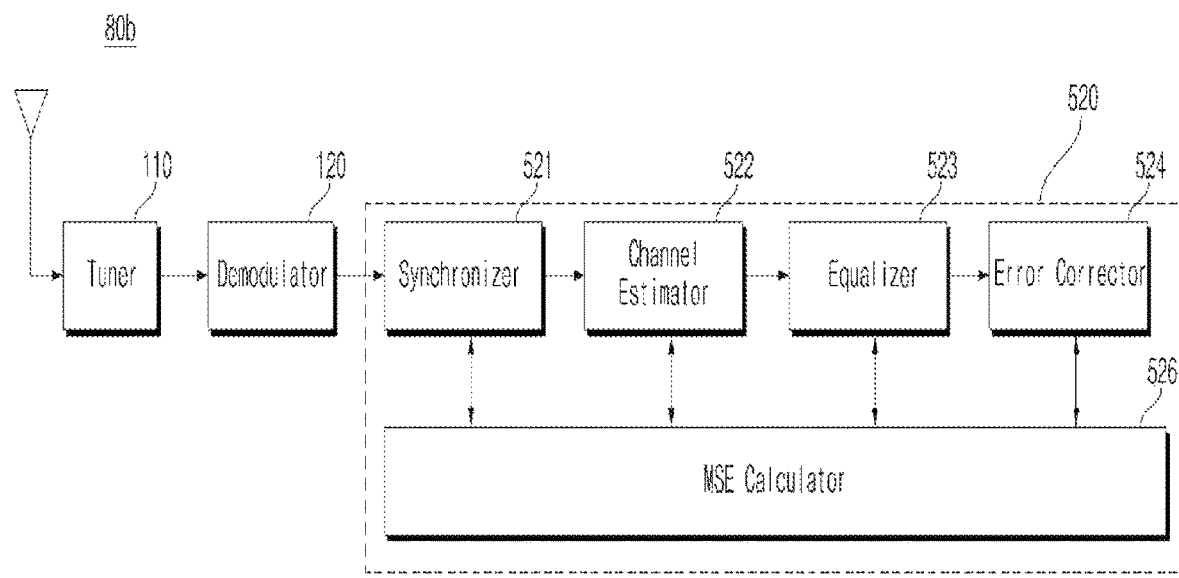
FIG. 5C is a block diagram illustrating an example of an RF signal processing device according to another embodiment of the present disclosure.

FIG. 5C is a block diagram illustrating an example of an RF signal processing device according to another embodiment of the present disclosure.

Referring to FIG. 5C, the RF signal processing device 80*b* is similar to the RF signal processing device 80 of FIG. 5B, but is different therefrom in that a demodulator 120 is further included between the tuner 110 and the signal processor 520.

The tuner 110 of FIG. 5C may receive an RF signal including noise derived from a communication channel, and may convert the RF signal into an intermediate frequency signal; and the demodulator 120 may convert the intermediate frequency signal into a baseband signal.

The signal processor 520 may perform signal processing on the baseband signal input from the demodulator 120, as illustrated in FIG. 5B.

Figure 5D:
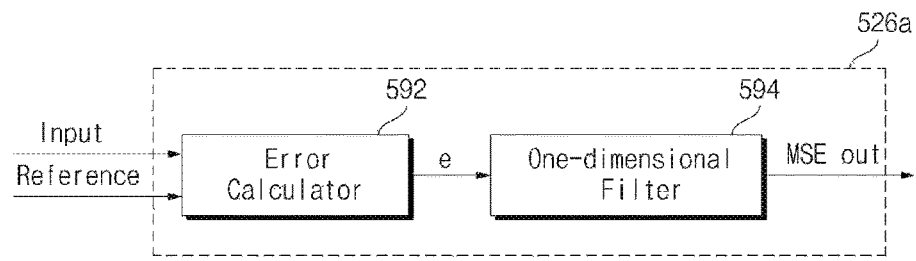
FIG. 5D is a block diagram illustrating a mean square error calculator according to an embodiment of the present disclosure.

FIG. 5D is a block diagram illustrating a mean square error calculator according to an embodiment of the present disclosure.

Referring to FIG. 5D, the mean square error calculator 526*a* includes a calculator 592 for calculating an error corresponding to a difference between input signal and a reference signal, and a filter 594 which performs one-dimensional filtering on the calculated error.

In this case, the filter 594 calculates a mean square error based on at least one of a time domain or a spatial domain, and performs filtering on the calculated mean square error.

However, in the mobile channel except for the static channel, or in the presence of burst noise or co-channel interference, the method may result in inaccurate calculation of mean square errors, such that error correction may not be performed properly.

Accordingly, the present disclosure proposes a method of performing three-dimensional calculation of a mean square error, rather than one-dimensional calculation, thereby improving accuracy in calculating a mean square error and accurately performing error correction in response to various communication channels or broadcast channels.

Figure 5E:
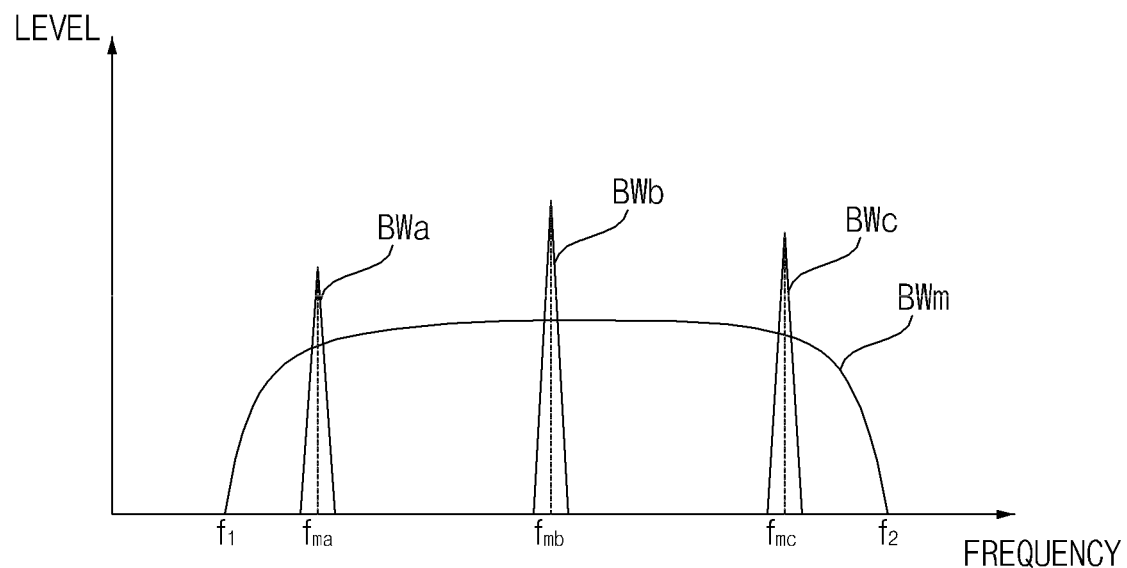
FIGS. 5E to 5F are diagrams referred to in explaining co-channel interference.
Figure 5F:
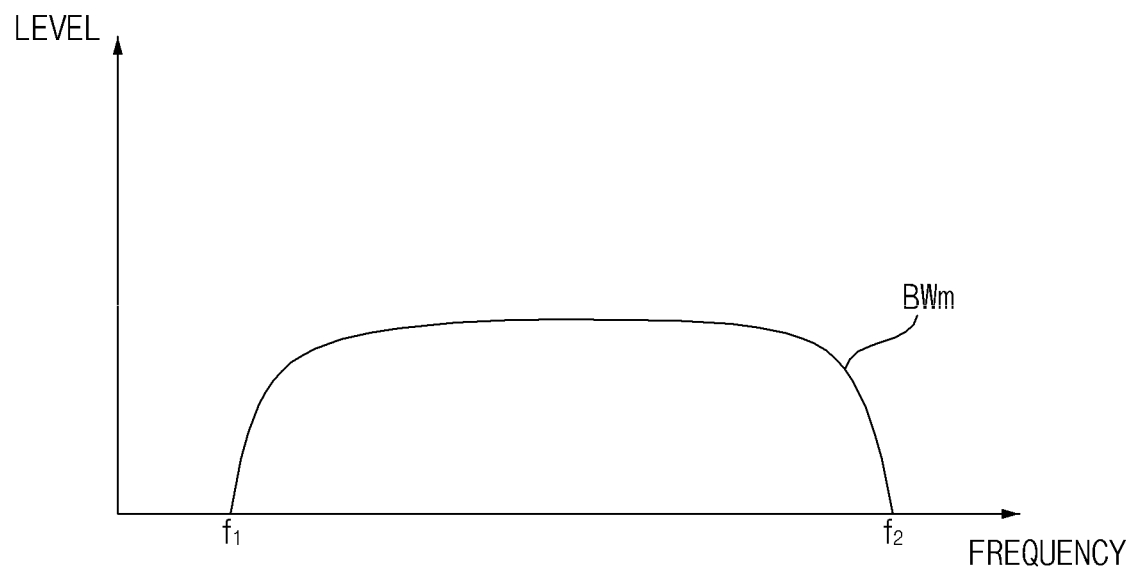

FIGS. 5E to 5F are diagrams referred to in explaining co-channel interference.

FIG. 5E illustrates frequency bands f1 to f2 of a baseband signal and frequency bands fma, fmb, and fmc of a co-channel interference signal.

Particularly, FIG. 5E illustrates an example where a maximum level in the frequency bands fma, fmb, and fmc of the co-channel interference signal is equal to or higher than a maximum level in the frequency bands f1 to f2 of the baseband signal.

FIG. 5E illustrates a case where the RF signal includes a co-channel interference signal, in which when a mean square error in a frequency domain is calculated for signal processing of the baseband signal, a defect occurs due to the co-channel interference signal included in the baseband signal. Accordingly, the present disclosure proposes a method of removing such defect, which will be described later with reference to FIG. 6 and the following figures.

FIG. 5F illustrates a frequency band of a baseband signal without a frequency band of a co-channel interference signal. In the case of FIG. 5F, a mean square error in a frequency domain may be calculated.

Figure 6:
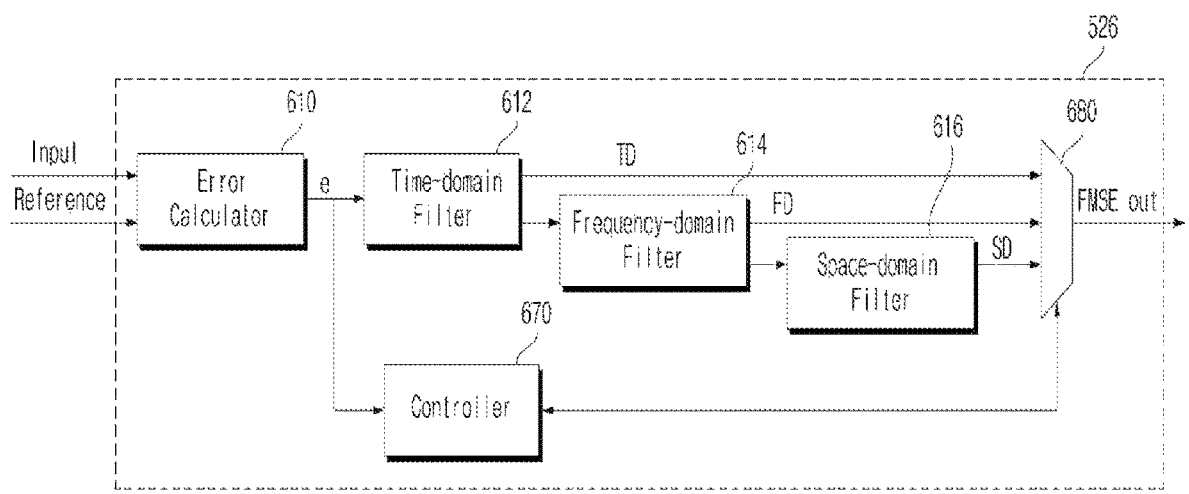
FIG. 6 is a block diagram illustrating an example of a mean square error calculator according to an embodiment of the present disclosure.

FIG. 6 is a block diagram illustrating an example of a mean square error calculator according to an embodiment of the present disclosure.

Referring to FIG. 6, the mean square error calculator 526 includes: an error calculator 610 for calculating an error e, which is a difference between in an input signal and a reference signal; a time-domain filter 612 for calculating a first mean square error in a time domain based on the calculated error e; a frequency-domain filter 614 for calculating a second mean square error in a frequency domain based on the calculated error e; a spatial-based calculation unit 616 for calculating a third mean square error in a spatial domain based on the calculated error e; and an error controller 670 which controls to output a final mean square error by selecting at least one of the mean square errors output by the time-domain filter 612, the frequency-domain filter 614, and the spatial-based calculation unit 616.

The mean square error calculator 526 may further include a final mean square error output unit 680 which performs multiplexing based on the first mean square error, the second mean square error, and the third mean square error, to output a final mean square.

As described above, the mean square error calculator 526 of FIG. 6 is used for each operation of the synchronizer 521, the channel estimator 522, the equalizer 523, and the error corrector 524 of FIG. 5B or 5C; and particularly, the mean square error calculator 526 of FIG. 6 may output the final mean square error (PMSE) to each unit.

Accordingly, the input signal, which is input to the calculation unit 492, may be a baseband signal input to the synchronizer 521, a synchronized signal input to the channel estimator 522, a signal which is input to the equalizer 523 and on which channel estimation is performed, or an equalized signal input to the error corrector 524.

The error controller 670 may control to output a final mean square error by using at least one of the mean square errors in the time domain, the frequency domain, and the spatial domain, thereby improving accuracy in calculating the mean square error in response to various communication channels or broadcast channels.

For example, in the case where the first mean square error TD is equal to or greater than a first reference value, the error controller 670 determines that a communication channel includes burst noise interference, and may control to output the final mean square error (PMSE) based on the second mean square error FD and the third mean square error SD, thereby improving accuracy in calculating the mean square error in response to the burst noise.

In another example, in the case where the first mean square error TD is equal to or greater than the first reference value, the error controller 670 determines that a communication channel includes burst noise interference, and may control to output the final mean square error (FMSE) based on the second mean square error FD and the third mean square error SD, thereby improving accuracy in calculating the mean square error in response to the burst noise.

In yet another example, in the case where the first mean square error TD is equal to or greater than the first reference value, and the second mean square error FD is less than a second reference value, the error controller 670 determines that a communication channel is a static channel, and may control to output the final mean square error (FMSE) based on the first mean square error TD and the second mean square error FD, based on the second mean square error FD and the third mean square error SD, or based on the first, the second, and the third mean square errors TD, FD, and SD, thereby improving accuracy in calculating the mean square error in response to the static channel.

In still another example, in the case where the third mean square error SD is equal to or greater than a fourth reference value, the error controller 670 determines that a communication channel is a mobile channel, and may control to output the final mean square error (PMSE) based on the first mean square error TD and the second mean square error FD, thereby improving accuracy in calculating the mean square error in response to the mobile channel.

In still another example, in the case where the second mean square error FD is equal to or greater than a second reference value, the error controller 670 determines that a communication channel includes co-channel interference noise, and may control to output the final mean square error (PMSE) based on the first mean square error TD, or based on the first mean square error TD and the third mean square error SD, thereby improving accuracy in calculating the mean square error in response to the co-channel interference noise.

Further, the error controller 670 may control to output a final mean square error (PMSE) by using a weighted value applied to the mean square error in each of the time domain, the frequency domain, and the spatial domain, thereby improving accuracy in calculating a mean square error in response to various communication channels or broadcast channels.

In the case where a received RF signal is a broadcast signal, the error controller 670 may vary a weighted value applied to the mean square error of each of the time domain, the frequency domain, and the spatial domain according to broadcast signal standards, and may control to output a final mean square error (PMSE) based on a varied weighted value, thereby improving accuracy in calculating a mean square error in response to various broadcast signal standards, and various communication channels or broadcast channels.

Further, in the case where the received RF signal is a digital broadcast signal, and particularly a digital broadcast signal of the Digital Terrestrial Multimedia Broadcast (DTMB) standard, the error controller 670 may control to output a final mean square error (PMSE) based on the first and the second mean square errors TD and FD, or based on the first, the second, and the third mean square errors TD, FD, and SD.

In addition, in the case where the received RF signal is a digital broadcast signal, and particularly a digital broadcast signal of the Advanced Television Systems Committee (ATSC) standard, the error controller 670 may control to output a final mean square error (PMSE) based on the first and the second mean square errors TD and FD, or based on the first, the second, and the third mean square errors TD, FD, and SD.

Moreover, in the case where the received RF signal is a mobile communication signal, the error controller 670 may control to output a final mean square error (PMSE) based on the first and the second mean square errors TD and FD.

The channel estimator 522 of FIG. 5A or 5B may perform channel estimation based on the final mean square error (PMSE) output in FIG. 6.

Specifically, the channel estimator 522 may perform channel estimation or interference estimation based on the first mean square error in the time domain, the second mean square error in the frequency domain, and the third mean square error in the spatial domain.

For example, in the case where the first mean square error is equal to or greater than a first reference value, the channel estimator 522 may estimate that a communication channel includes burst noise interference.

In another example, in the case where the first mean square error is equal to or greater than the first reference value, and the second mean square error is less than a second reference value, the channel estimator 522 may estimate that a communication channel includes burst noise interference.

In yet another example, in the case where the first to the third mean square errors are less than a third reference value, the channel estimator 522 may estimate that a communication channel is the static channel.

In still another example, in the case where the third mean square error is equal to or greater than a fourth reference value, the channel estimator 522 may estimate that a communication channel is the mobile channel or includes co-channel interference noise.

Alternatively, in the case where the second mean square error FD is equal to or greater than a sixth reference value, the channel estimator 522 may estimate that a communication channel includes co-channel interference noise.

The error corrector 524 of FIG. 5A or 5B may perform error correction based on the final mean square error (FMSE) output by the mean square error calculator 526.

In the case where an RF signal includes a co-channel interference signal, the error corrector 524 may perform error correction by using the mean square error in the time domain or the mean square errors in the time domain and the spatial domain, thereby obtaining a baseband signal, from which a defect is removed, in response to various communication channels or broadcast channels.

In the case where a maximum level in a frequency band of a co-channel interference signal is equal to or higher than a maximum level in a frequency band of a baseband signal, the mean square error calculator 526 may output a final mean square error by using the mean square error in the time domain or the mean square errors in the time domain and the spatial domain, instead of the frequency domain. The error corrector 524 may perform error correction using the final mean square error to output an error-corrected signal, thereby obtaining a baseband signal, from which a defect is removed, in response to various communication channels or broadcast channels.

Further, in the case where an RF signal includes a burst noise, which occurs sporadically in the time domain, the mean square error calculator 526 may output a final mean square error by using the mean square error in at least one of the frequency domain or the spatial domain, and the error corrector 524 may perform error correction using the final mean square error to output an error-corrected signal.

FIGS. 7A to 13B are diagrams referred to in explaining operations of the RF signal processing device of FIG. 5B or 5C.

Figure 7A:
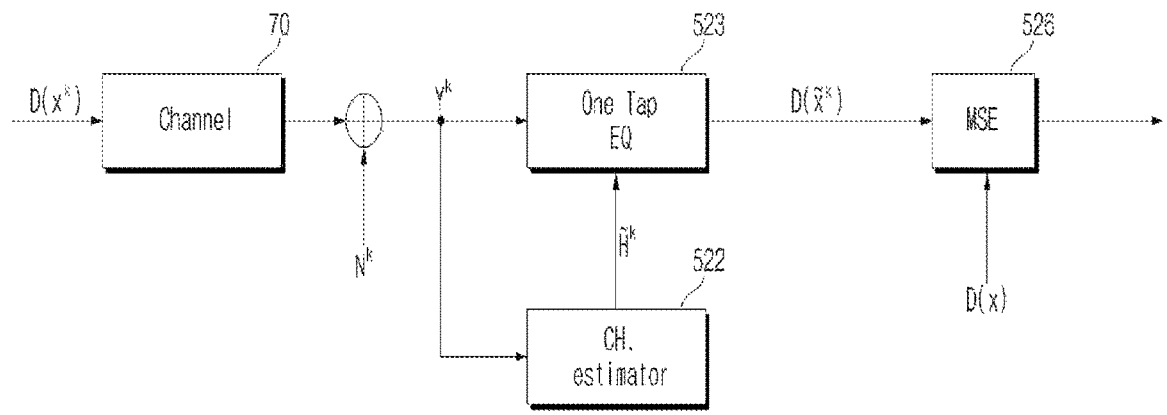
FIGS. 7A to 13B are diagrams referred to in explaining operations of the RF signal processing device of FIG. 5B or 5C.

FIG. 7A is a diagram illustrating signal processing performed by the RF signal processing device according to an embodiment of the present disclosure.

Referring to FIG. 7A, a noise signal $N^k$, derived from the communication channel 70, is added to an RF signal $D(x^k)$ transmitted by the wireless signal transmitting device 10, and the RF signal processing device 80 receives an RF signal $Y^k$, to which the noise signal $N^k$ is added.

The RF signal $Y^k$, to which the noise signal $N^k$ is added, may be represented by the following Equation 1.

$$Y^k = H^k D(x^k) + N^k \qquad \text{[Equation 1]}$$

The channel estimator 522, included in the RF signal processing device 80, may perform channel estimation or interference estimation based on the RF signal $Y^k$, to which the noise signal $N^k$ is added.

The equalizer 523, included in the RF signal processing device 80, performs channel equalization following the channel estimation, and may output a signal $D(\tilde{x}^k)$, on which the channel equalization is performed.

The signal $D(\tilde{x}^k)$, output by the equalizer 523, may be represented by the following Equation 2.

$$D(\tilde{x}^k) = \frac{Y^k}{\hat{H}^k} = \frac{H^k}{\hat{H}^k} D(x^k) + \frac{N^k}{\hat{H}^k} = D(x^k) + \tilde{N}^k \qquad \text{[Equation 2]}$$

Then, the mean square error calculator 526 may calculate a mean square error by using the signal output by the equalizer 523.

In this case, as described above, the mean square error calculator 526 may calculate an error e, which is a difference between an equalized input signal and a pilot signal which is a reference signal; based on the calculated error e, may calculate at least one of the first mean square error TD in the time domain, the second mean square error FD in the frequency domain, and the third mean square error SD in the spatial domain; and may output a final mean square error (FMSE) by selecting at least one of the first mean square error TD, the second mean square error FD, and the third mean square error SD.

Figure 7B:
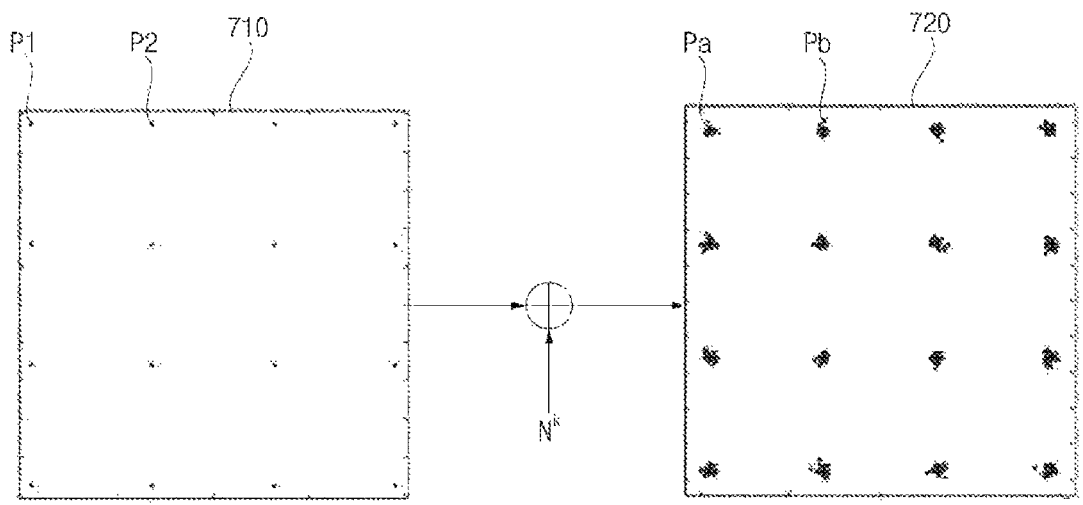

FIG. 7B illustrates a first In-phase versus Quadrature (IQ) signal constellation diagram 710 of the RF signal $D(x^k)$ transmitted by the wireless signal transmitting device 10, and a second IQ signal constellation diagram 720 of the RF signal $Y^k$, to which the noise signal $N^k$ is added and which is received by the wireless signal processing device 80.

Compared to noise variances P1, P2, . . . in the first IQ signal constellation diagram 710, noise variances Pa, Pb, . . . in the second IQ signal constellation diagram 720 becomes larger due to the noise signal derived from the communication channel 70.

Figure 7C:
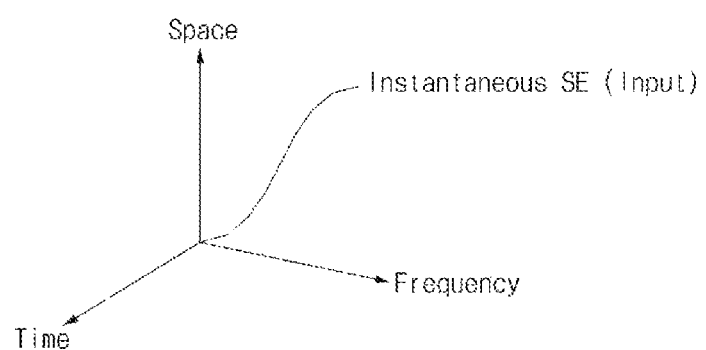

FIG. 7C is a diagram illustrating a square error processed by the wireless signal processing device 80 in a time domain, a frequency domain, and a spatial domain.

The square error of FIG. 7C may be represented by the following Equation 3.

$$SE = \sum_{i=1}^{n} (e_i^T |D(\tilde{x}^k) - D(x^k)|^2 e_i) = \varepsilon^k \quad \text{[Equation 3]}$$

That is, FIG. 7C illustrates an example where the square error is represented in a three-dimensional space of a time domain, a frequency domain, and a spatial domain.

Figure 7D:
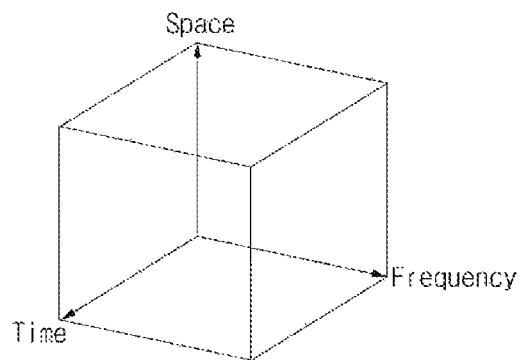

Accordingly, the present disclosure proposes a method of calculating an optimal mean square error by calculating a mean square error in a three-dimensional space, as illustrated in FIG. 7D, with respect to a noise signal in various communication channels.

That is, the present disclosure proposes three-dimensional calculation of a mean square error, instead of one-dimensional calculation.

FIGS. 8A to 8D are diagrams illustrating an example of three-dimensional modeling of a mean square error in various communication channels.

Figure 8A:
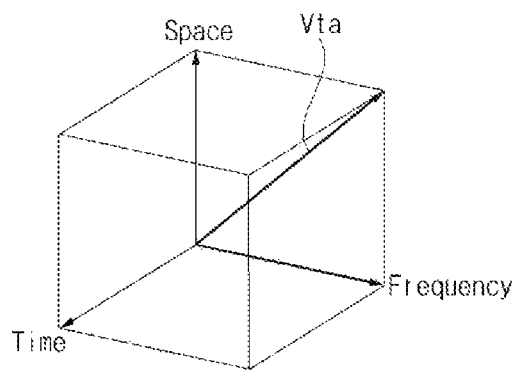

FIG. 8A is a diagram illustrating a mean square error Vta in burst noise.

The burse noise occurs mostly in the time domain, among the time, frequency, and spatial domains. Accordingly, it is desired that the mean square error Vta in the burst noise is calculated in the frequency domain, or in the frequency domain and the spatial domain, as illustrated in FIG. 8A.

For example, in the case where the first mean square error TD in the time domain is equal to or greater than a first reference value, the error controller 670 may control to output a final mean square error (FSME) based on the second mean square error in the frequency domain and the third mean square error in the spatial domain.

In another example, in the case where the first mean square error TD is equal to or greater than a first reference value, and the second mean square error is less than a second reference value, the error controller 670 may control to output a final mean square error (FSME) based on the second mean square error and the third mean square error.

In yet another example, in the case where the first mean square error TD in the time domain is equal to or greater than the first reference value, the error controller 670 may control to output a final mean square error (FSME) based on the second mean square error in the frequency domain.

In still another example, in the case where the first mean square error TD is equal to or greater than the first reference value, and the second mean square error FD is less than the second reference value, the error controller 670 may control to output a final mean square error (FMSE) based on the second mean square error.

Figure 8B:
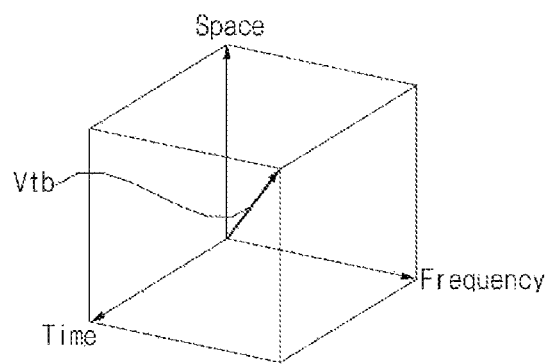

FIG. 8B is a diagram illustrating a mean square error Vtb in a static channel.

Noise in the static channel occurs in each of the time domain, the frequency domain, and the spatial domain, but the magnitude of the noise is small, such that the mean square error Vtb in the static channel may be calculated in the time domain, the frequency domain, and the spatial domain, as illustrated in FIG. 8B.

For example, in the case where the first to the third mean square errors are less than a third reference value, the error controller 670 may control to output a final mean square error (FMSE) based on the first and the second mean square errors TD and FD, or based on the first to the third mean square errors TD, FD, and SD.

Figure 8C:
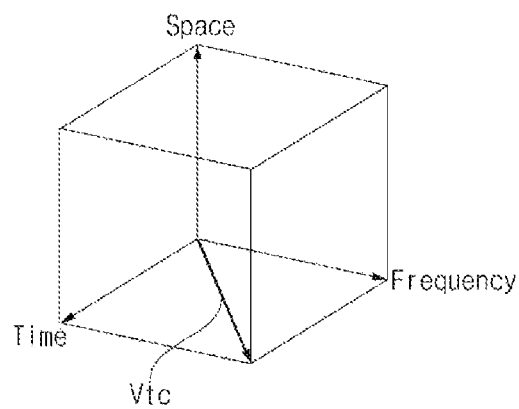

FIG. 8C is a diagram illustrating a mean square error Vtc in a mobile channel.

Noise in the mobile channel occurs mostly in the spatial domain, among the time, frequency, and spatial domains. Accordingly, the mean square error Vtc in the mobile channel may be calculated in the time domain and the frequency domain, as illustrated in FIG. 8C.

For example, in the case where the third mean square error SD is equal to or greater than a fourth reference value, the error controller 670 may control to output a final mean square error (FMSE) based on the first and the second mean square errors TD and FD.

Figure 8D:
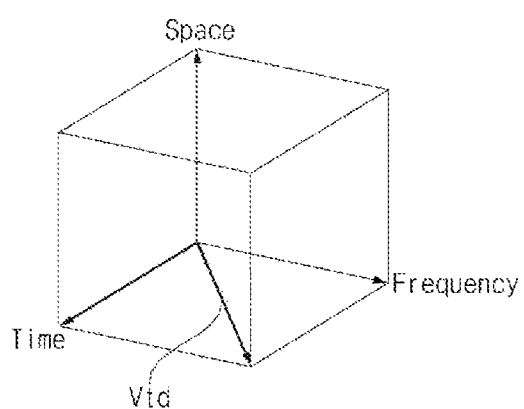

FIG. 8D is a diagram illustrating a mean square error Vtd in co-channel interference.

Noise in the co-channel interference occurs mostly in the frequency domain, among the time, frequency, and spatial domains. Accordingly, it is desired that the mean square error Vtd in the co-channel interference is calculated in the time domain, in the time domain and the frequency domain, or in the time domain and the spatial domain, as illustrated in FIG. 8D.

For example, in the case where the third mean square error SD is equal to or greater than a fifth reference value, the error controller 670 may control to output a final mean square error (FMSE) based on the first mean square error TD, or based on the first mean square error TD and the second mean square error FD.

Figure 9A:
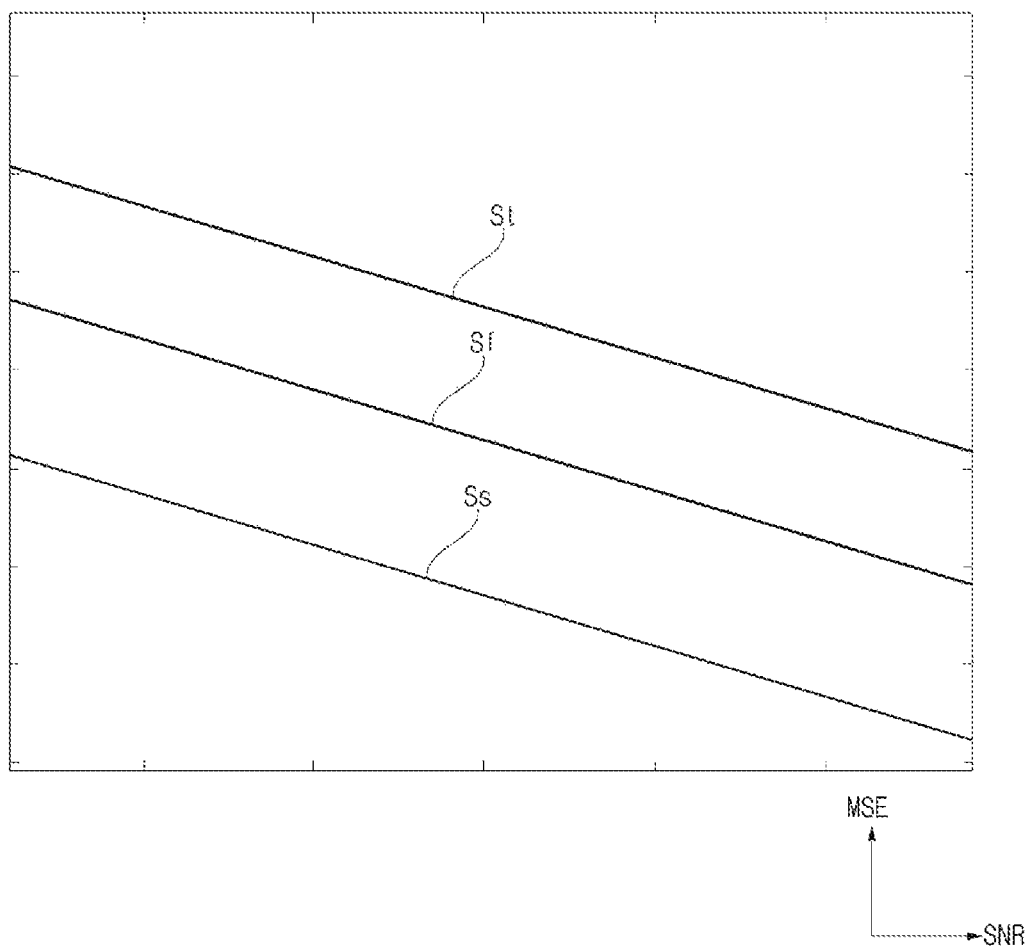

FIG. 9A is a signal-to-noise ratio (SNR) versus mean square error (MSE) performance graph, with respect to Additive white Gaussian noise (AWGN) in a Rayleigh Channel, which is one of the static channels.

Referring to FIG. 9A, in the case where AWGN exists in the Rayleigh Channel, a mean square error St in the time domain has the highest level; a mean square error Sf in the frequency domain has a level lower than the level of the mean square error St; and a mean square error Ss in the time domain, the frequency domain, and the spatial domain has the lowest level.

Accordingly, in the Rayleigh Channel, which is one of the static channels, it is desired that a final mean square error (FMSE) is calculated based on the first to the third mean square errors TD, FD, and SD, among the first to the third mean square errors TD, FD, and SD.

Accordingly, it is desired that the mean square error calculator 526 calculates the final mean square error (FMSE) based on the first to the third mean square errors TD, FD, and SD in the static channel.

Although not illustrated FIG. 9A, the mean square error in the frequency domain and the spatial domain is lower than the mean square error ST in the time domain and the mean square error Sf in the frequency domain.

Further, in the Rayleigh channel which is one of the static channels, the mean square error calculator 526 may also calculate the final mean square error (FMSE) based on the first and the second mean square errors TD and FD, among the first to the third mean square errors TD, FD, and SD.

Figure 9B:
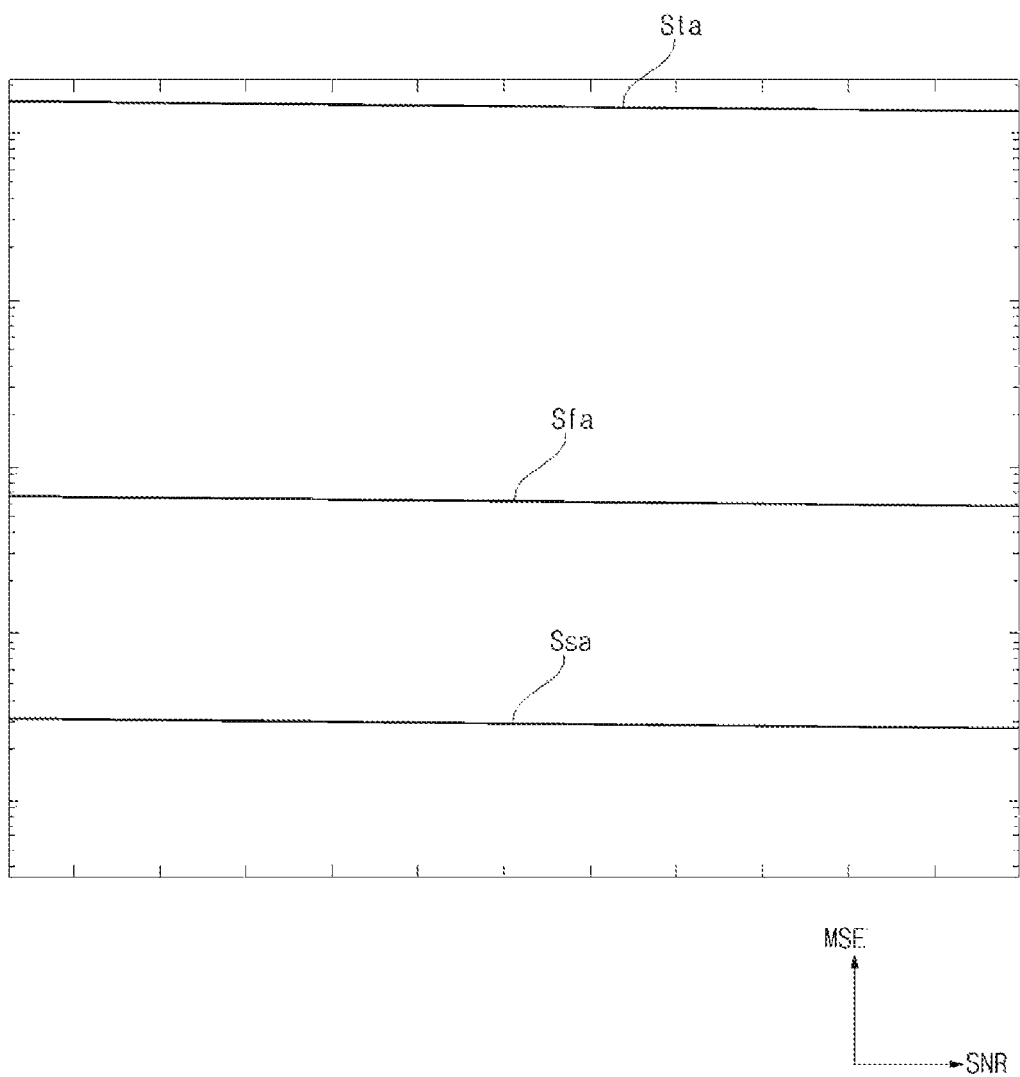

FIG. 9B is an SNR versus MSE performance graph, with respect to Rayleigh fading in a Rayleigh Channel which is one of the static channels.

Referring to FIG. 9B, in the case where Rayleigh fading occurs in a Rayleigh Channel, the mean square error St in the time domain has the highest level, the mean square error Sf in the frequency domain is lower than the level of the mean square error St, and the mean square error Ss in the time, frequency, and spatial domains has the lowest level.

Accordingly, in the static channel, it is desired that the mean square error calculator 526 calculates the final mean square error (FMSE) based on the first to the third mean square errors TD, FD, and SD.

That is, in the static channel, it is desired that the mean square error calculator 526 calculates the final mean square error (FMSE) based on the first to the third mean square errors TD, FD, and SD.

Although not illustrated FIG. 9B, the mean square error in the frequency domain and the spatial domain is lower than the mean square error ST in the time domain and the mean square error Sf in the frequency domain.

Further, in the Rayleigh channel which is one of the static channels, the mean square error calculator 526 may also calculate the final mean square error (FMSE) based on the first and the second mean square errors TD and FD, among the first to the third mean square errors TD, FD, and SD.

Figure 9C:
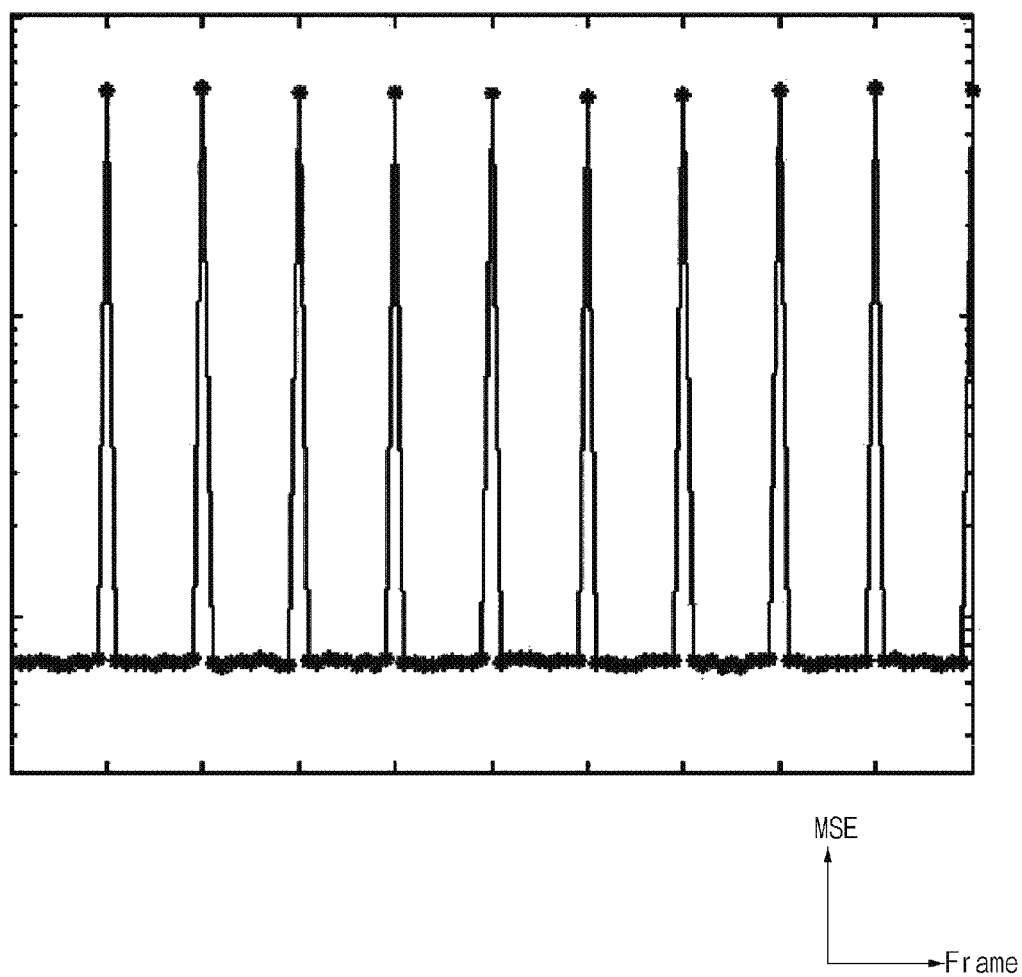
Figure 9D:
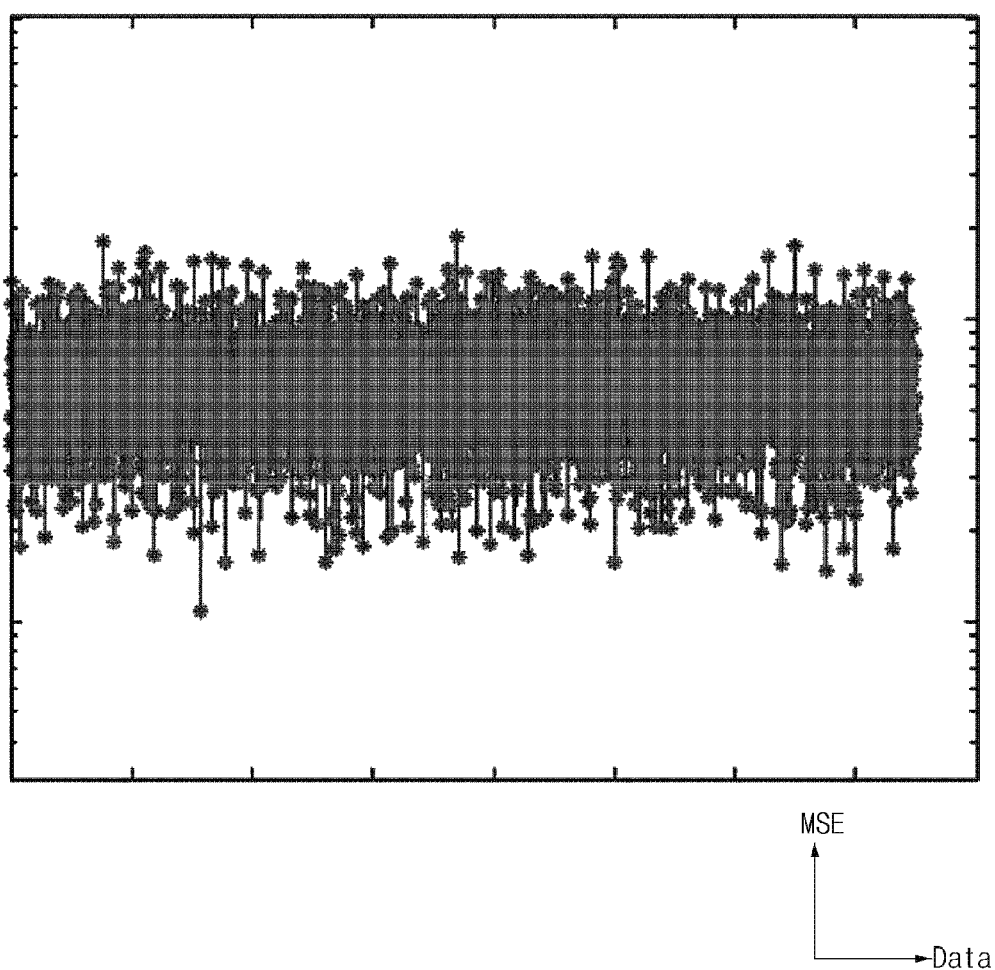

FIG. 9C is a diagram illustrating a mean square error in a frequency domain with respect to a noise signal in burst noise; and FIG. 9D is a diagram illustrating a mean square error in a time domain with respect to a noise signal in burst noise.

Referring to FIG. 9C, mean square errors in the frequency domain with respect to the burst noise are shown clearly at each frequency.

Referring to FIG. 9D, mean square errors in the time domain with respect to the burst noise are shown unclearly.

Accordingly, in the burst noise, it is desired that the mean square error calculator 526 calculates the mean square error in the frequency domain as illustrated in FIG. 9C, rather than FIG. 9D.

Figure 10A:
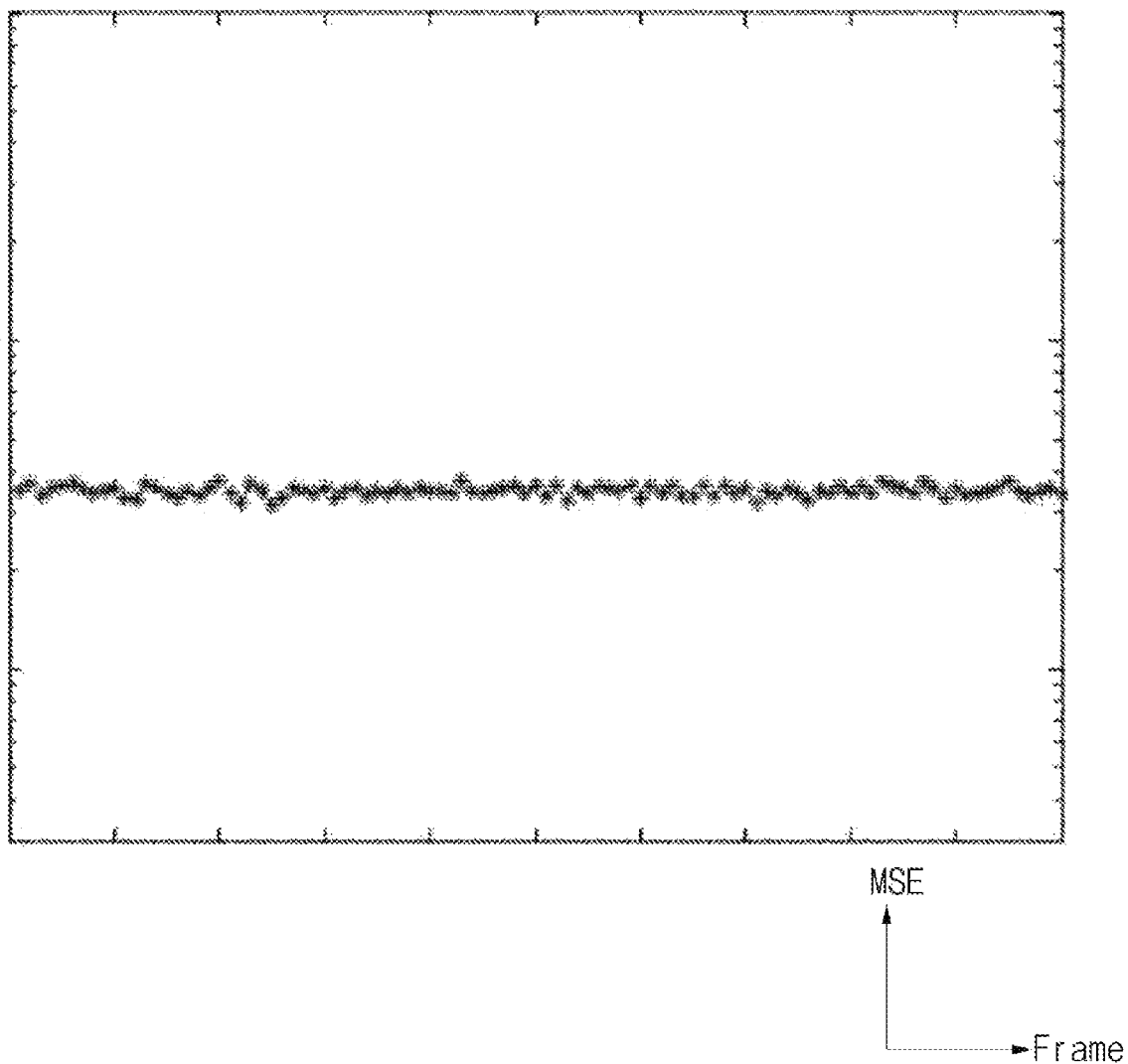
Figure 10B:
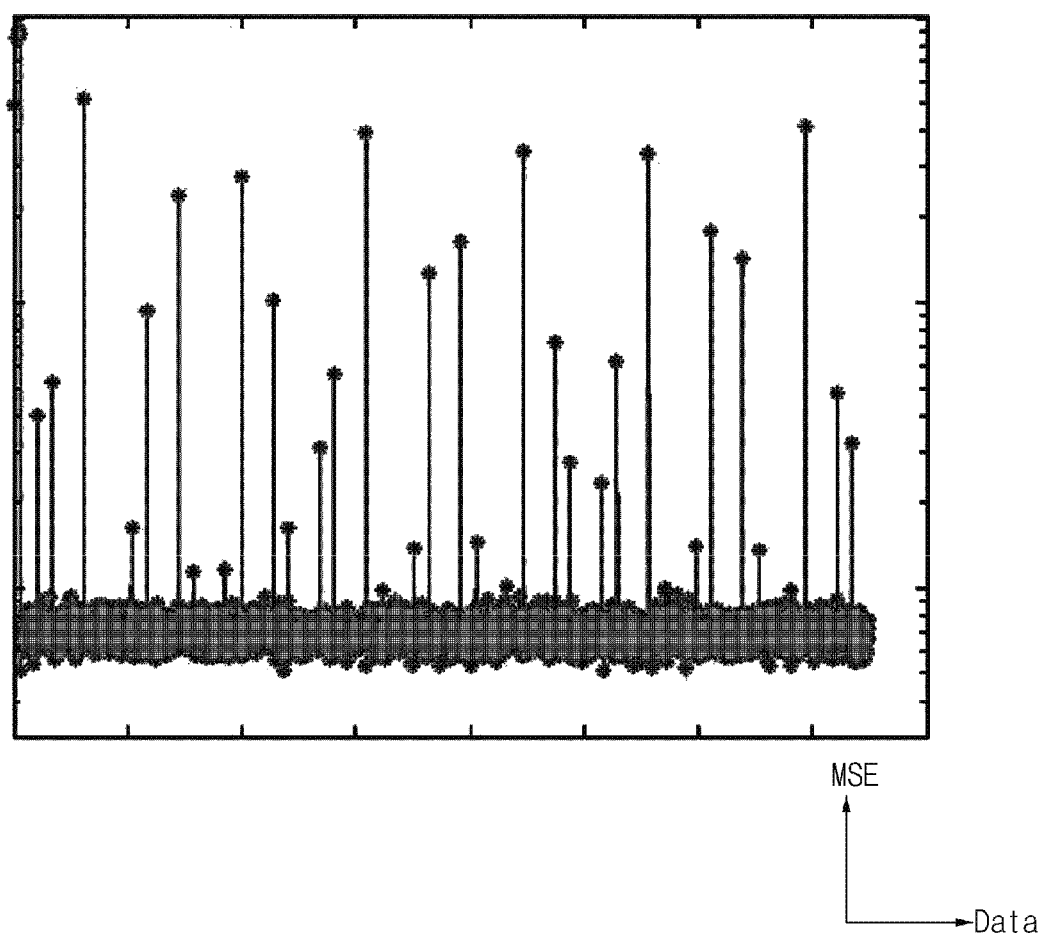

FIG. 10A is a diagram illustrating a mean square error in a frequency domain with respect to a noise signal in co-channel interference; and FIG. 10B is a diagram illustrating a mean square error in a time domain with respect to a noise signal in co-channel interference.

Referring to FIG. 10A, mean square errors in the frequency domain with respect to the co-channel interference are shown unclearly.

Referring to FIG. 10B, mean square errors in the time domain with respect to the co-channel interference are shown clearly.

Accordingly, in the co-channel interference, it is desired that the mean square error calculator 526 calculates the mean square error in the time domain as illustrated in FIG. 10B, rather than FIG. 10A.

Figure 11A:
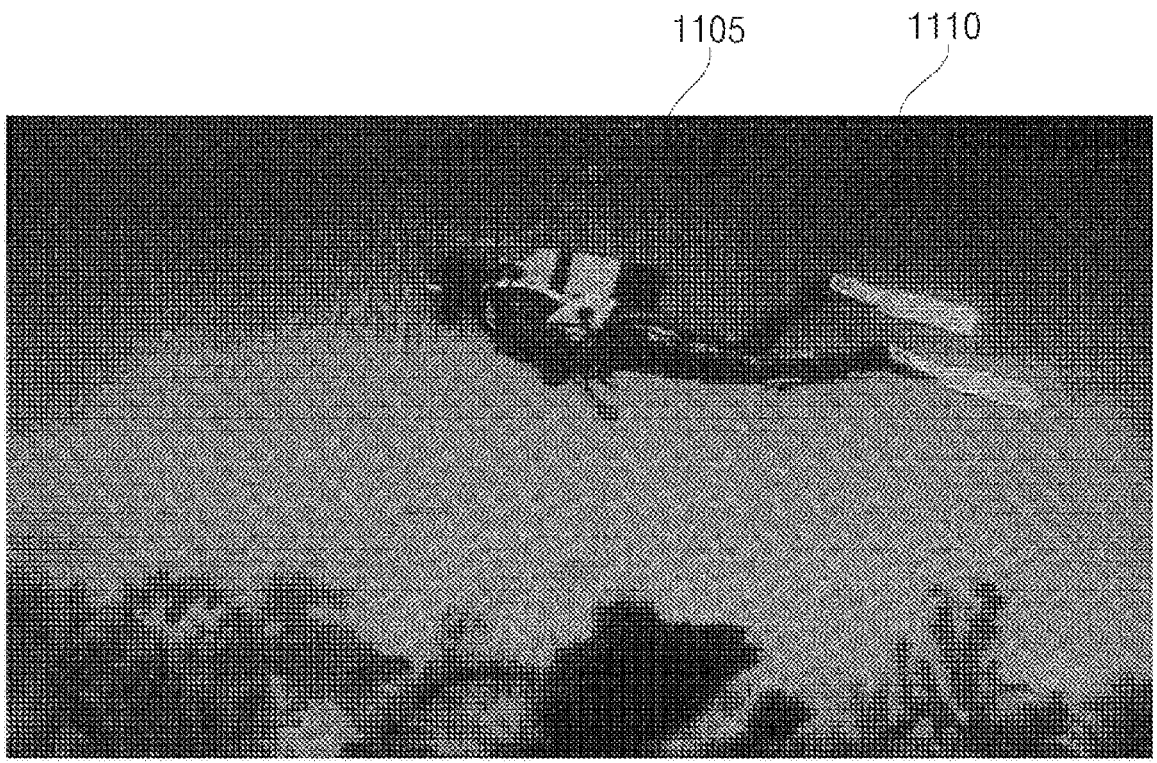
Figure 11B:

FIGS. 11A and 11B are diagrams each illustrating images 1110 and 1120 displayed as a result of signal processing based on a noise signal in burst noise.

As described above, the noise signal in the burst noise mostly occurs in the time domain.

Accordingly, by one-dimensional calculation of a mean square error as performed by the mean square error calculator 526a of FIG. 5D, particularly by calculation of a mean square error in the time domain, a defect 1105 occurs in an image 1110 of FIG. 11A.

By contrast, by three-dimensional calculation of a mean square error as performed by the mean square error calculator 526 of FIG. 6, particularly by calculation of a final mean square error based on the mean square error in the frequency domain and the mean square error in the spatial domain, the defect may be removed as shown in an image 1120 of FIG. 11B.

Figure 12A:
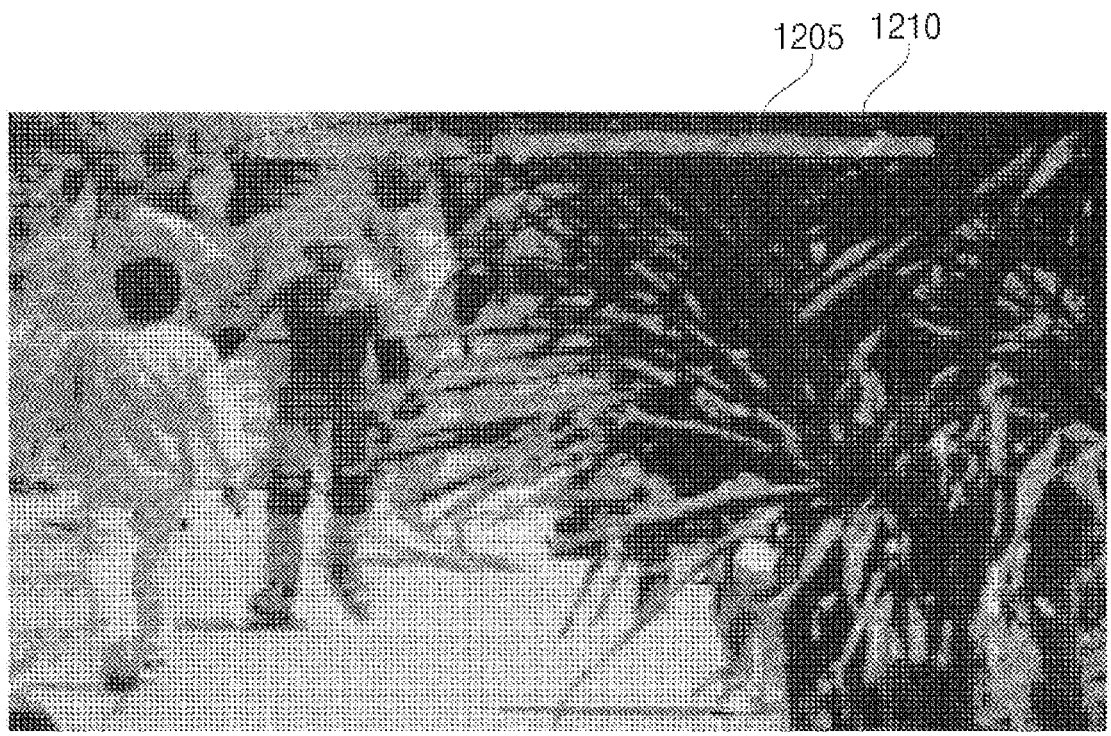
Figure 12B:

FIGS. 12A and 12B are diagrams each illustrating images 1210 and 1220 displayed as a result of signal processing based a noise signal in a mobile channel.

As described above, the noise signal in the mobile channel mostly occurs in the spatial domain.

Accordingly, by one-dimensional calculation of a mean square error as performed by the mean square error calculator 526a of FIG. 5D, particularly by calculation of a mean square error in the spatial domain, a defect 1205 occurs in an image 1210 of FIG. 12A.

By contrast, by three-dimensional calculation of a mean square error as performed by the mean square error calculator 526 of FIG. 6, particularly by calculation of a final mean square error based on the mean square error in the time domain and the mean square error in the frequency domain, the defect may be removed as shown in an image 1220 of FIG. 12B.

Figure 13A:
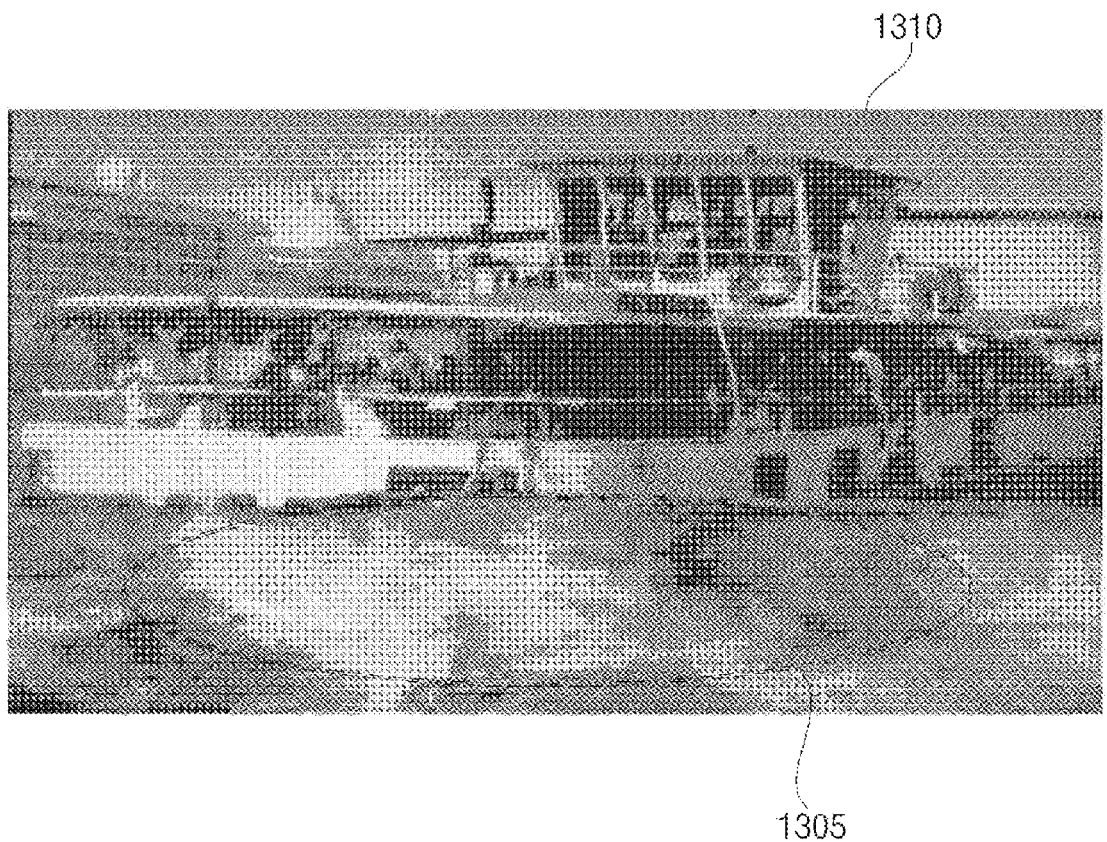
Figure 13B:
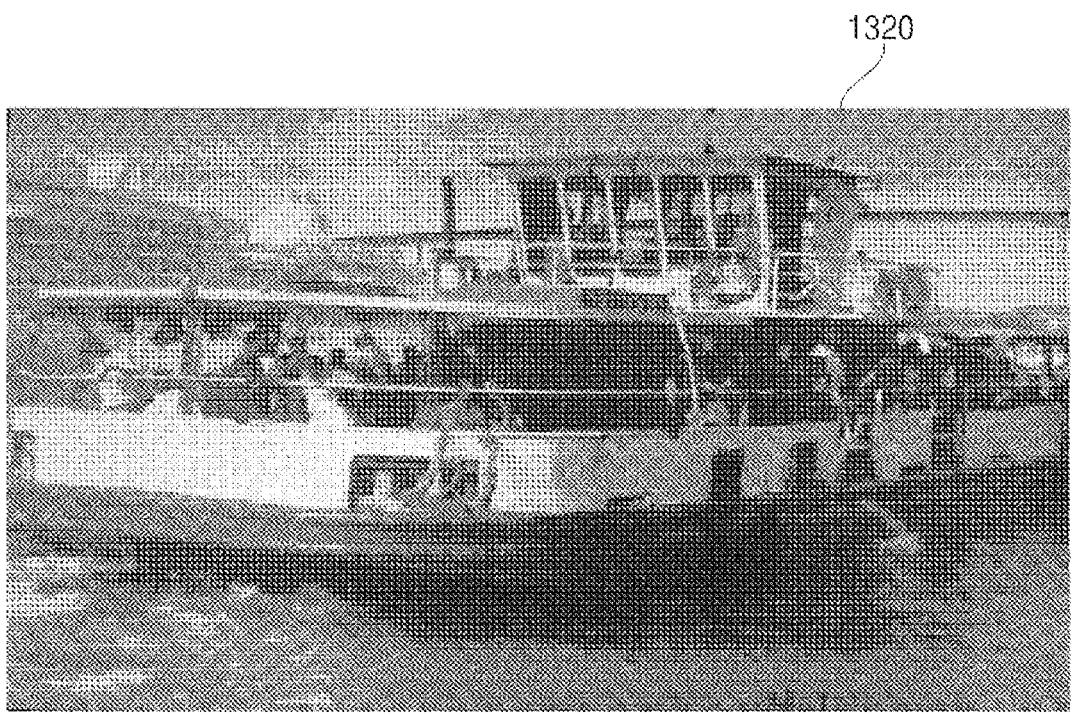

FIGS. 13A and 13B are diagrams each illustrating images 1310 and 1320 displayed as a result of signal processing based a noise signal in co-channel interference.

As described above, the noise signal in the co-channel interference mostly occurs in the spatial domain.

Accordingly, by one-dimensional calculation of a mean square error as performed by the mean square error calculator 526a of FIG. 5D, particularly by calculation of a mean square error in the frequency domain, a defect 1305 occurs in an image 1310 of FIG. 13A.

By contrast, by three-dimensional calculation of a mean square error as performed by the mean square error calculator 526 of FIG. 6, particularly by calculation of a final mean square error based on the mean square error in the time domain, the defect may be removed as shown in an image 1320 of FIG. 13B.

By contrast, by three-dimensional calculation of a mean square error as performed by the mean square error calculator 526 of FIG. 6, particularly by calculation of a final mean square error based on the mean square error in the time domain and the mean square error in the frequency domain, the defect may be removed as shown in an image 1320 of FIG. 13B.

As described above, in the case where the RF signal includes a co-channel interference signal, the display 180 may display a broadcast image, from which a defect is removed after the RF signal is processed by the signal processing device 520.

In the case where a maximum level in a frequency band of a co-channel interference signal is equal to or higher than a maximum level in a frequency band of a baseband signal, the signal processing device 520 may perform error correction by using the mean square error in the time domain, instead of the frequency domain, or using the mean square errors in the time domain and the spatial domain, to output an error-corrected signal.

Further, in the case where the RF signal includes a burst noise which occurs sporadically in the time domain, the signal processing device 520 may perform error correction by using the mean square error in at least one of the frequency domain or the spatial domain, to output an error-corrected signal.

That is, in the case where the RF signal includes the burst noise which occurs sporadically in the time domain, the display 180 may display a broadcast image, from which a defect is removed after the RF signal is processed by the signal processing device 520.

As described above, the RF signal processing device described above with reference to FIGS. 5B to 13B may calculate a final mean square error by three-dimensional calculation of a mean square error with respect to a channel noise, and may adaptively perform signal processing of a baseband signal by using the calculated final mean square error, thereby enabling stable error correction and the like.

Accordingly, based on received broadcast signals, the image display apparatus 100 such as TV may display clear images without errors.

Further, based on mobile communication signals received from the mobile terminal 100*b*, a voice call, a video call, content transmission, and the like may be provided without errors.

In the present disclosure, description is made using an example of processing a baseband signal based on an Orthogonal Frequency Division Multiplexing (OFDM) RF signal, but the present disclosure is not limited thereto, and may also be applied to processing of a baseband signal based on a single-carrier RF signal.

The method of operating the RF signal processing device or the image display apparatus can be realized as a computer-readable code written on a computer-readable recording medium included in the RF signal processing device or the image display apparatus. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner.

As is apparent from the above description, according to an embodiment of the present invention, there is provided a signal processing device for processing a baseband signal demodulated from an RF signal, the device including: a synchronizer to synchronize a signal based on the baseband signal; a channel estimator to perform interference estimation or channel estimation based on a signal output from the synchronizer; an equalizer to perform equalization based on a signal output from the channel estimator; an error corrector to perform error correction based on a signal output from the equalizer; and a mean square error calculator to calculate a mean square error based on a difference between an input signal from the equalizer and a reference signal, wherein when the RF signal includes a co-channel interference signal, the error corrector performs error correction by using a mean square error in a time domain or mean square errors in a time domain and a spatial domain. Accordingly, a baseband signal, from which a defect is removed, may be obtained in response to various communication channels and broadcast channels.

When the RF signal includes the co-channel interference signal, the mean square error calculator may calculate a final mean square error by using the mean square error in the time domain or the mean square errors in the time domain and the spatial domain; and the error corrector may perform error correction by using the final mean square error to output an error-corrected signal. Accordingly, a baseband signal, from which a defect is removed, may be obtained in response to various communication channels and broadcast channels.

When a maximum level in a frequency band of the co-channel interference signal is equal to or higher than a maximum level in a frequency band of the baseband signal, the mean square error calculator may output a final mean square error by using the mean square error in the time domain or the mean square errors in the time domain and the spatial domain, instead of a frequency domain; and the error corrector may perform error correction by using the final mean square error to output an error-corrected signal. Accordingly, a baseband signal, from which a defect is removed, may be obtained in response to various communication channels and broadcast channels.

When the RF signal includes a burst noise, the mean square error calculator may output a final mean square error by using a mean square error in at least either one of the frequency domain or the spatial domain; and the error corrector may perform error correction by using the final mean square error to output an error-corrected signal. Accordingly, a baseband signal, from which a defect is removed, may be obtained in response to various communication channels and broadcast channels.

The mean square error calculator may calculate mean square errors in at least one of the time domain, the frequency domain, and the spatial domain, and may output a final mean square error by using at least one of the calculated mean square errors; and the equalizer may perform the equalization by using the calculated final mean square error based on the input signal and the reference signal. Accordingly, a baseband signal, from which a defect is removed, may be obtained in response to various communication channels and broadcast channels.

The mean square error calculator may calculate an error based on a difference between the input signal from the error corrector and the reference signal, and based on the calculated error e, may calculate mean square errors in at least one of the time domain, the frequency domain, and the spatial domain, to output a second final mean square error by using at least one of the calculated mean square errors; and the error corrector may perform error correction by using the second final mean square error which is calculated by the mean square error calculator. Accordingly, a baseband signal, from which a defect is removed, may be obtained in response to various communication channels and broadcast channels.

The mean square error calculator may include: an error calculator to calculate an error corresponding to a difference between the reference signal and the input signal; a time-domain filter to calculate a first mean square error in the time domain based on the calculated error e; a frequency-domain filter to calculate a second mean square error in a frequency domain based on the calculated error e; a space-domain filter to calculate a third mean square error in a spatial domain based on the calculated error e; and an error controller to control to output a final mean square error by using at least one of the mean square errors output by the time-domain filter, the frequency-domain filter, and the space-domain filter. Accordingly, a baseband signal, from which a defect is removed, may be obtained in response to various communication channels and broadcast channels.

In response to the first mean square error being equal to or greater than a first reference value, the error controller may control to output the final mean square error based on the second mean square error and the third mean square error. Accordingly, a baseband signal, from which a defect is removed, may be obtained in response to various communication channels and broadcast channels.

In response to the first mean square error being equal to or greater than the first reference value, and the second mean square error being less than a second reference value, the error controller may control to output the final mean square error based on the second and the third mean square errors. Accordingly, a baseband signal, from which a defect is removed, may be obtained in response to various communication channels and broadcast channels.

In response to the first to the third mean square errors being less than a third reference value, the error controller may control to output the final mean square error based on the first and the second mean square errors or based on the first to the third mean square errors. Accordingly, a baseband signal, from which a defect is removed, may be obtained in response to various communication channels and broadcast channels.

In response to the third mean square error being equal to or greater than a fourth reference value, the error controller may control to output the final mean square error based on the first and the second mean square errors. Accordingly, a baseband signal, from which a defect is removed, may be obtained in response to various communication channels and broadcast channels.

In response to the input baseband signal being a baseband signal corresponding to a broadcast signal, the error controller may control to output the final mean square error based on the first and the second mean square errors. Accordingly, a baseband signal, from which a defect is removed, may be obtained in response to various communication channels and broadcast channels.

The mean square error calculator may output a final mean square error by using a weighted value applied to the mean square error in each of the time domain, the frequency domain, and the spatial domain.

The signal processing device may further include a tuner to receive the RF signal, including noise derived from a communication channel, and to convert the received RF signal into a baseband signal, wherein the channel estimator may perform channel estimation based on the baseband signal input from the tuner. Accordingly, a baseband signal, from which a defect is removed, may be obtained in response to various communication channels and broadcast channels.

The signal processing device may further include: a tuner to receive the RF signal, including noise derived from a communication channel, and to convert the received RF signal into an intermediate frequency signal; and a demodulator to convert the intermediate frequency signal into the baseband signal, wherein the channel estimator may perform channel estimation based on the baseband signal input from the demodulator. Accordingly, a baseband signal, from which a defect is removed, may be obtained in response to various communication channels and broadcast channels.

According to another embodiment of the present invention, there is provided an image display apparatus including: a signal processing device to process a baseband signal demodulated from an RF signal: a controller to extract a broadcast image from a broadcast signal received from the signal processing device; and a display to display the extracted broadcast image; wherein when the RF signal includes a co-channel interference signal, the display displays a broadcast image processed by the signal processing device to remove a defect. Accordingly, a baseband signal, from which a defect is removed, may be obtained in response to various communication channels and broadcast channels.

While the present disclosure has been shown and described with reference to the preferred embodiments thereof, it should be understood that the present disclosure is not limited to the specific embodiments, and various modifications and variations may be made by those skilled in the art without departing from the scope and spirit of the invention as defined by the appended claims, and the modified implementations should not be construed independently of the technical idea or prospect of the present disclosure.

What is claimed is:

1. An image display apparatus, comprising: a tuner configured to receive a radio frequency (RF) signal and to convert the received RF signal into a baseband signal, wherein the RF signal includes noise from a communication channel; a signal processing device configured to process the baseband signal demodulated from the tuner, the signal processing device being configured to, based on the RF signal including a co-channel interference signal, perform an error correction based on a mean square error in a time domain or mean square errors in a time domain and a spatial domain;

a display configured to display a broadcast image, from which a defect is removed after the baseband signal is processed by the signal processing device;

wherein the signal processing device comprises: a synchronizer to synchronize a signal based on the baseband signal; a channel estimator to perform interference estimation or channel estimation based on a signal output from the synchronizer; an equalizer to perform equalization based on a signal output from the channel estimator; an error corrector to perform error correction based on a signal output from the equalizer; and a mean square error calculator to calculate a mean square error based on a difference between an input signal from the equalizer and a reference signal, wherein when the RF signal includes a co-channel interference signal, the error corrector performs error correction by using a mean square error in a time domain or mean square errors in a time domain and a spatial domain.

2. The image display apparatus according to claim 1, wherein when a maximum level in a frequency band of the co-channel interference signal is equal to or higher than a maximum level in a frequency band of the baseband signal, the signal processing device performs error correction by using a mean square error in a time domain or mean square errors in a time domain and a spatial domain, instead of a frequency domain, to output an error-corrected signal.

3. The image display apparatus according to claim 1, wherein when the RF signal includes burst noise, which occurs sporadically in the time domain, the signal processing device performs error correction by using a mean square error in at least either one of a frequency domain or the spatial domain, to output an error-corrected signal.

4. The image display apparatus according to claim 1, wherein: when the RF signal includes the co-channel interference signal, the mean square error calculator calculates a final mean square error by using the mean square error in the time domain or the mean square errors in the time domain and the spatial domain; and the error corrector performs error correction by using the final mean square error to output an error-corrected signal.

5. The image display apparatus according to claim 1, wherein: when a maximum level in a frequency band of the co-channel interference signal is equal to or higher than a maximum level in a frequency band of the baseband signal, the mean square error calculator outputs a final mean square error by using the mean square error in the time domain or the mean square errors in the time domain and the spatial domain, instead of a frequency domain; and the error corrector performs error correction by using the final mean square error to output an error-corrected signal.

6. The image display apparatus according to claim 1, wherein: when the RF signal includes a burst noise, the mean square error calculator outputs a final mean square error by using a mean square error in at least either one of a frequency domain or the spatial domain; and the error corrector performs error correction by using the final mean square error to output an error-corrected signal.

7. The image display apparatus according to claim 1, wherein: the mean square error calculator calculates mean square errors in at least one of the time domain, a frequency domain, and the spatial domain, and outputs a final mean square error by using at least one of the calculated mean square errors; and the equalizer performs the equalization by using the calculated final mean square error based on the input signal and the reference signal.

8. The image display apparatus according to claim 1, wherein: the mean square error calculator calculates an error e based on a difference between the input signal from the error corrector and the reference signal, and based on the calculated error e, calculates mean square errors in at least one of the time domain, a frequency domain, and the spatial domain, to output a second final mean square error by using at least one of the calculated mean square errors; and the error corrector performs error correction by using the second final mean square error calculated by the mean square error calculator.

9. The image display apparatus according to claim 1, wherein the mean square error calculator comprises: an error calculator to calculate an error corresponding to a difference between the reference signal and the input signal; a time-domain filter to calculate a first mean square error in the time domain based on the calculated error e; a frequency-domain filter to calculate a second mean square error in a frequency domain based on the calculated error;

a space-domain filter to calculate a third mean square error in a spatial domain based on the calculated error; and an error controller to control to output a final mean square error by using at least one of the mean square errors output by the time-domain filter, the frequency-domain filter, and the space-domain filter.

10. The image display apparatus according to claim 9, wherein in response to the first mean square error being equal to or greater than a first reference value, the error controller controls to output the final mean square error based on the second mean square error and the third mean square error.

11. The image display apparatus according to claim 9, wherein in response to the first mean square error being equal to or greater than a first reference value, and the second mean square error being less than a second reference value, the error controller controls to output the final mean square error based on the second and the third mean square errors.

12. The image display apparatus according to claim 9, wherein in response to the first to the third mean square errors being less than a third reference value, the error controller controls to output the final mean square error based on the first and the second mean square errors or based on the first to the third mean square errors.

13. The image display apparatus according to claim 9, wherein in response to the third mean square error being equal to or greater than a fourth reference value, the error controller controls to output the final mean square error based on the first and the second mean square errors.

14. The image display apparatus according to claim 13, wherein in response to an input baseband signal being a baseband signal corresponding to a broadcast signal, the error controller controls to output the final mean square error based on the first and the second mean square errors.

15. The image display apparatus according to claim 1, wherein the mean square error calculator outputs a final mean square error by using a weighted value applied to the mean square error in each of the time domain, a frequency domain, and the spatial domain.

16. The image display apparatus according to claim 1, wherein the channel estimator performs channel estimation based on the baseband signal input from the tuner.

17. An image display apparatus, comprising:
a tuner configured to receive a radio frequency (RF) signal and to convert the received RF signal into a baseband signal, wherein the RF signal includes noise from a communication channel;
a signal processing device configured to process the baseband signal demodulated from the tuner, the signal processing device being configured to, based on the RF signal including a burst noise, perform an error correction based on a mean square error in at least either one of a frequency domain or a spatial domain; and
a display configured to display a broadcast image, from which a defect is removed after the baseband signal is processed by the signal processing device,
wherein the signal processing device comprises: a synchronizer to synchronize a signal based on the baseband signal; a channel estimator to perform interference estimation or channel estimation based on a signal output from the synchronizer; an equalizer to perform equalization based on a signal output from the channel estimator; an error corrector to perform error correction based on a signal output from the equalizer; and
a mean square error calculator to calculate a mean square error based on a difference between an input signal from the equalizer and a reference signal, wherein when the RF signal includes a co-channel interference signal, the error corrector performs error correction by using a mean square error in a time domain or mean square errors in a time domain and a spatial domain.

18. An image display apparatus, comprising:
a tuner configured to receive a radio frequency (RF) signal and to convert the received RF signal into a baseband signal, wherein the RF signal includes noise from a communication channel;
a signal processing device configured to process the baseband signal demodulated from the tuner, the signal processing device being configured to, based on the RF signal including a co-channel interference signal, perform an error correction based on a mean square error in a time domain or mean square errors in a time domain and a spatial domain;
display configured to display a broadcast image, from which a defect is removed after the baseband signal is processed by the signal processing device, wherein the signal processing device is configured to estimate the communication channel as any one of a static channel or a mobile channel based on the mean square error in the spatial domain;
wherein the signal processing device comprises: a synchronizer to synchronize a signal based on the baseband signal; a channel estimator to perform interference estimation or channel estimation based on a signal output from the synchronizer; an equalizer to perform equalization based on a signal output from the channel estimator; an error corrector to perform error correction based on a signal output from the equalizer; and
a mean square error calculator to calculate a mean square error based on a difference between an input signal from the equalizer and a reference signal, wherein when the RF signal includes a co-channel interference signal, the error corrector performs error correction by using a mean square error in a time domain or mean square errors in a time domain and a spatial domain.

* * * * *